(12) United States Patent
Croak et al.

(10) Patent No.: US 11,979,410 B1
(45) Date of Patent: May 7, 2024

(54) USER PRESENCE FOR AUTHENTICATION

(71) Applicant: Lookout, Inc., San Francisco, CA (US)

(72) Inventors: Tyler Croak, Columbia, MD (US); Brian James Buck, Livermore, CA (US); Pritesh Kasliwal, Apex, NC (US)

(73) Assignee: Lookout, Inc., Boston, MA (US)

( * ) Notice: Subject to any disclaimer, the term of this patent is extended or adjusted under 35 U.S.C. 154(b) by 0 days.

(21) Appl. No.: 18/160,984

(22) Filed: Jan. 27, 2023

(51) Int. Cl.
*H04L 29/00* (2006.01)
*H04L 9/40* (2022.01)

(52) U.S. Cl.
CPC .......... *H04L 63/107* (2013.01); *H04L 63/102* (2013.01); *H04L 63/18* (2013.01); *H04L 2463/082* (2013.01)

(58) Field of Classification Search
CPC ..... H04L 63/107; H04L 63/102; H04L 63/18; H04L 2463/082
See application file for complete search history.

(56) References Cited

U.S. PATENT DOCUMENTS

| | | | |
|---|---|---|---|
| 8,838,803 B2* | 9/2014 | Bennett | G06F 21/6218 726/16 |
| 9,407,443 B2* | 8/2016 | Wyatt | H04L 43/04 |
| 9,432,361 B2 | 8/2016 | Mahaffey et al. | |
| 9,763,097 B2 | 9/2017 | Robinson et al. | |
| 9,769,160 B2* | 9/2017 | Park | H04L 63/105 |
| 10,360,364 B2 | 7/2019 | Robinson et al. | |
| 11,017,069 B2 | 5/2021 | Robinson et al. | |
| 11,140,157 B1* | 10/2021 | Xia | H04L 63/0853 |
| 11,611,550 B1* | 3/2023 | Chavez | H04L 63/20 |
| 2005/0225427 A1 | 10/2005 | Bell et al. | |
| 2012/0045994 A1* | 2/2012 | Koh | H04W 12/02 455/41.3 |
| 2013/0237190 A1* | 9/2013 | Smith | H04L 9/3215 455/411 |
| 2014/0282877 A1* | 9/2014 | Mahaffey | H04W 12/33 726/3 |

(Continued)

FOREIGN PATENT DOCUMENTS

CN          101256700 A         9/2008

OTHER PUBLICATIONS

"How Ultra Wideband Makes Connected Devices Easier to Find," Svannah Cuthbert, Jan. 22, 2021.

(Continued)

*Primary Examiner* — Don G Zhao
(74) *Attorney, Agent, or Firm* — Dergosits & Noah LLP

(57) ABSTRACT

Methods and systems provide for multi-factor authentication (MFA) of a user to a device or network in which a criteria for maintaining the authentication is based on the presence of the user before a device. After the user is authenticated and provided with access, a continuity criteria (i.e., a measure of the presence of the user before the device) must be fulfilled for that access to be maintained. When it is determined that the continuity requirement is not fulfilled, an aspect of the access is denied. A continuity criteria may be based on the location of a second computing device with respect to a first computing device. And multiple methods of determining continuity may be employed simultaneously, with access being denied when continuity is fulfilled by none of the methods.

17 Claims, 10 Drawing Sheets

(56) References Cited

U.S. PATENT DOCUMENTS

| | | | | |
|---|---|---|---|---|
| 2014/0289867 | A1* | 9/2014 | Bukai | G06F 21/44 726/28 |
| 2014/0335789 | A1* | 11/2014 | Cohen | H04W 12/50 455/41.2 |
| 2016/0021117 | A1* | 1/2016 | Harmon | H04L 63/20 726/1 |
| 2016/0057139 | A1* | 2/2016 | McDonough | H04L 63/168 726/6 |
| 2016/0099938 | A1* | 4/2016 | Seo | H04L 63/0869 713/169 |
| 2016/0269403 | A1* | 9/2016 | Koutenaei | H04L 63/102 |
| 2016/0337863 | A1* | 11/2016 | Robinson | H04W 4/021 |
| 2017/0078454 | A1* | 3/2017 | Berookhim | H04W 8/18 |
| 2017/0289168 | A1* | 10/2017 | Bar | H04L 63/102 |
| 2017/0302659 | A1* | 10/2017 | Shteingart | H04W 12/065 |
| 2017/0372055 | A1* | 12/2017 | Robinson | H04W 12/64 |
| 2018/0077168 | A1* | 3/2018 | Shen | H04L 43/106 |
| 2018/0234411 | A1* | 8/2018 | Masiero | H04L 63/0853 |
| 2019/0006891 | A1* | 1/2019 | Park | H04W 4/80 |
| 2019/0188368 | A1* | 6/2019 | Hastings | H04L 63/0492 |
| 2019/0286806 | A1* | 9/2019 | Robinson | H04L 63/0853 |
| 2019/0372989 | A1* | 12/2019 | Shultz | G06F 21/41 |
| 2019/0386984 | A1* | 12/2019 | Thakkar | H04L 63/18 |
| 2020/0213298 | A1* | 7/2020 | Ericson | H04W 12/47 |
| 2020/0327965 | A1* | 10/2020 | Davydov | G06F 16/22 |
| 2020/0404003 | A1* | 12/2020 | Alameh | H04L 9/0819 |
| 2020/0413251 | A1* | 12/2020 | Wei | H04L 63/083 |
| 2021/0058395 | A1* | 2/2021 | Jakobsson | H04L 67/306 |
| 2021/0136129 | A1* | 5/2021 | Ponnusamy | G06F 3/1423 |
| 2021/0385224 | A1* | 12/2021 | Singh | H04L 63/0853 |
| 2022/0070166 | A1* | 3/2022 | Aunger | G06F 21/316 |
| 2022/0255913 | A1* | 8/2022 | Zacks | G06F 21/31 |
| 2022/0255929 | A1* | 8/2022 | Rafferty | H04L 63/0876 |

OTHER PUBLICATIONS

Google patents English Language Translation of CN101256700 A.
USPTO Non-Final Office Action dated Sep. 26, 2022 in U.S. Appl. No. 17/328,882.

* cited by examiner

USER PRESENCE FOR AUTHENTICATION

TECHNICAL FIELD

The claimed subject matter relates generally to the field of user authentication and more specifically to multi-factor user authentication.

BACKGROUND

Credential theft is a standard method for attackers to either get initial access to a customer's network, or to otherwise move laterally within a network. To combat credential theft, the typical Multi-Factor Authentication (MFA) of a user involves using three main components to verify that the user is who they say they are. These components include: something the user knows (e.g., a password), something the user "is" (e.g., biometrics), or something the user has (e.g., a smartphone, a YubiKey).

MFA adoption is growing (and will continue to grow) but has not yet become a de facto norm across all organizations. Even then, there have been many observations of attacks currently in the wild that show MFA being compromised, so it may be assumed that with greater adoption of MFA it is likely that additional MFA exploits will be developed and relied on by attackers to continually compromise networks. As a result, the primary three factors that are relied upon for MFA are not enough.

Additionally, the user experience involved in verifying their authentication, while simple enough in many cases (a click of a button on your phone), does not provide a seamless user experience and still requires periodic interaction. The other challenge presented with current implementations of MFA is that access windows, even when time-bound, vary greatly. For example, to log onto a laptop, the user must enter "something you know" (a password) every 8 hours. But to log onto a phone, the user must show something the user is (a thumbprint), every time the user wishes to unlock the device. Then, to log onto a server, the user must provide something the user has (a YubiKey), once every session.

These time-bound access windows often vary and are not universally treated or controlled in the same manner. The window intervals may vary to provide a balance between convenience and security. Where convenience is prioritized over security, an overly long window leaves an opportunity for an attacker to compromise the device and perform malicious operations within the time window.

Thus, it would be desirable for a method of MFA that enhances the user experience and promotes adoption while reducing or eliminating access windows.

BRIEF DESCRIPTION OF THE DRAWINGS

The embodiments are illustrated by way of example and not limitation in the figures of the accompanying drawings, in which like references indicate similar elements, and in which.

DETAILED DESCRIPTION

Some embodiments employ components in MFA that are not widely recognized or used heavily within the industry. These include: something the user does, and somewhere the user is. Such embodiments solve some of the challenges with current implementations of MFA. To align with Just-In-Time principles for authenticated access, MFA may rely on these other factors to provide authentication. As part of this solution, the primary factors to be leveraged include: "something you are"; "something you have"; "something you do"; and "somewhere you are".

To provide Just-In-Time access to a client device (Laptop, Mobile phone), network, or remote system in a secure manner, some embodiments provide continuous authentication. "Just-In-Time" access may be understood as a label for methods that provide a temporary access whereas "continuous authentication" may be understood as a label for methods that use the methods or principles of Just-In-Time access to provide continuous access. Thus, while continuous authentication may seem contrary to Just-In-Time access, fundamentally, continuous access as described in many of the embodiments within, is an expansion of Just-In-Time access concepts.

Embodiments may concern the case where an employee works from various locations on a week-by-week basis. The scenario assumes that the employee subscribes to four "work" personas: Working from a corporate office ("Corporate"); Working from a home office ("Home"); Working from a shared office (Starbucks, Shared Space) ("Shared"); and Working while traveling ("Travel").

When an employee is working from any of these locations, they are often in a fixed-length (or dimensions) room. This fixed-length room does not typically change. With corporate offices, the "walls" may typically be a cubicle, in which case this is also fixed length. Within a home office, there are typically no cubicle walls, and real walls may be measured. When traveling, an employee may be in many rooms or in the same room, e.g., as in a hotel. Lastly, when in a shared space there may either be cubicles or a shared open floor plan (which has fixed length walls). In most cases, an employee will be either in a corporate office, home office, or shared office. Exceptions to this may be consultants, sales staff, etc., that travel regularly as part of their work.

When the employee is in the Corporate, Home, or Shared persona, organizations may follow any of a number of embodiments providing continuous authentication via validation of somewhere the user is.

Figure 1:
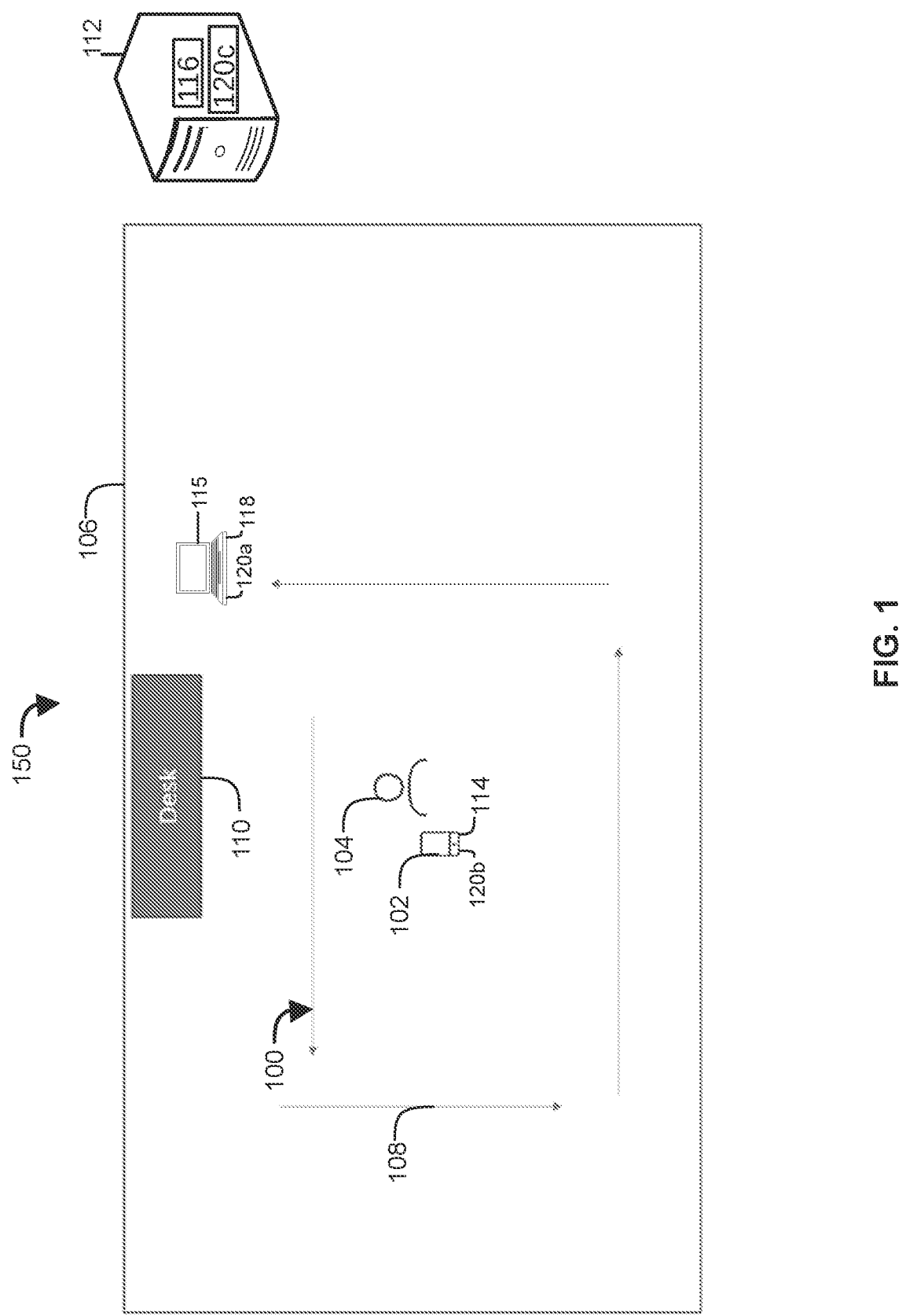
FIG. 1 is a schematic illustrating aspects of an embodiment employing user presence for authentication.

FIG. 1 is a schematic illustrating aspects of embodiments employing user presence for authentication, in particular somewhere the user is. In FIG. 1, a system 100 employing user presence for authentication, includes an authenticating computing device 102 associated with a user 104. Computing device 102 includes a security component 114 (e.g., a User Presence Application (UPA)). System 100 may be used to authenticate user 104 to system 100 when the user is in the Corporate, Home, or Shared persona associated with a specific location, e.g., a room 106. In the embodiment, in an initial step or registration, user 104 opens component 114 on authenticating computing device 102, e.g., a smartphone, and takes an accurate measurement of room 106. This step may employ existing technology. For example, the application may require user 104 to walk in directions 108 around room 106 with device/phone 102 in hand and recording the circumnavigation, capturing room dimensions. An embodiment may require user 104 to take one or more images of room 106, capturing room dimensions, and/or room details, such as desk 110. The photo(s) or measurements may be stored locally and accessible by security component 114 and a security component executing on a network-enabled server (e.g., a Cloud Service) and may be encrypted, e.g., with AES512 encryption. In some embodiments, only measurement data (and not photos) are stored by the security component to validate room size.

Once the initial measurements are acquired and stored, when a request is received by the security component to authenticate user 104 to computing device 102, security component 114 determines which of the personas is relevant. The determination of the relevant persona may include security component 114 comparing context information associated with the request to context information associated with the potential personas and choosing the persona having context information most similar to or the same as the provided context information. Having determined the relevant persona, and that room 106 is associated with that persona, the security component sends a request to device 102 for measurement data (replicating the type of initial measurement, e.g., a circumnavigation of the room, or one or more photos). Upon receiving the requested measurement data, security component 114 compares the received data to the stored data. If the data matches to a sufficient degree, then user 104 is determined by security component 114 to meet that particular criteria of the authentication process. If the user also meets other criteria of the MFA process (not specified in this method), then security component 114 authenticates user 104 to computing device 102, allowing user 104 a degree of access to computing device 102. In an embodiment, that degree of access may be complete or less than complete. In an embodiment, the degree of access may be determined by security component 114 from a policy or instructions associated with the relevant persona. In embodiments, policies and personas may be stored in databases 120a . . . 120c that are accessible to the security component on the device on which the database is located. In embodiments, databases 120a . . . 120c may be in communication such that an update to one database is propagated to the other databases.

In an embodiment, once user 104 is authenticated to device 102, 118, or server 112, to remain authenticated, a continuity criteria may be required. In an embodiment, the continuity requirement may include the security component occasionally or as needed sending a request to the device for measurement data (replicating the type of initial measurement, e.g., a circumnavigation of the room, or one or more photos). Upon receiving the requested measurement data, security component 114 compares the received data to the stored data. If the data matches to a sufficient degree, then user 104 is determined by security component 114 to have continuity of presence with the device, and the continuity criteria is fulfilled. However, if the data does not match to a sufficient degree, then the continuity criteria is not fulfilled and the security component denies at least some degree or aspect of the access provided after the initial MFA authentication request. In an embodiment, the request to the device for measurement data may be sent with a frequency that is determined, e.g., by the relevant persona, or by a policy associated with the user, or by a security level associated with the user. For example, a user persona may require a high level of security, which in turn requires the security component to send a request for measurement data immediately upon determining that just-received data matches to a sufficient degree.

In an embodiment, a system 150 employing user presence for authentication, includes an authenticating computing device 118 associated with user 104. Computing device 118 includes a security component 115 (e.g., a different instantiation of the UPA). In the same manner described above with regard to system 100, system 150 may be used to authenticate user 104 to system 150 when the user is in the Corporate, Home, or Shared persona associated with a specific location, e.g., a room 106. However, the capabilities of system 150 may differ from those of system 100. For example, computing device 118 may be a desktop computer with limited camera options. Thus, user 104 may not be able to circumnavigate room 106. For that reason, security components 114, 115 may be provided with context information regarding the capabilities of their respective devices 102, 118. Based on that capability information, components 114, 115 may choose the type of measurement data to request from user 104 during the initial measurement step and subsequent authentication step.

In embodiments, systems 100, 150 may provide initial measurement data regarding room 106 to a security component 116 executing on a network-enabled server 112. Security component 116 may control access to a network associated with server 112. After the initial provision of measurement data, user 104 may request access to server 112 from security component 116. As described above, security component 116 determines which of the personas is relevant from context information received in the request. Having determined the relevant persona, and, from context information associated with the persona, that room 106 is associated with that persona, security component 116 sends a request to the requesting device for measurement data. When the requesting device has capabilities equal to or greater than the device that provided the measurement data (such as when device 102 provided the initial data and a similar or more capable device provided the subsequent request for authentication, or when device 118 provided both the initial data and a similar or more capable device provided the subsequent request for authentication), security component 116 requests measurement data equal to the initial measurement data.

However, security component 116 has options when, for example, the requesting device is less capable than the initial device (such as when device 102 provided the initial data, but device 118 requested authentication). A first option exists when security component 116 can determine from context information associated with the request that a sufficiently capable device is associated with user 104 in this persona. For example, if user 104 requested authentication from device 118, then security component 116 may determine from context information associated with the relevant persona that user 104 may be in possession of device 102. In such case, security component 116 may request the measurement data for authentication from device 102. A second option addresses the case when a sufficiently capable device is not associated with user 104 in the relevant persona. In this case, security component 116 may modify the request for authenticating measurement data to adapt the request to the capabilities of the requesting device. For example, security component 116 may request that a camera of device 118 be oriented in a specific direction to capture a specific room dimension or feature. After pursuing either of these options, security component 116 proceeds as described with respect to component 114 by comparing the received data to the stored data. If the data matches to a sufficient degree, then user 104 is determined by security component 116 to meet that particular criteria of the authentication process. If the user also meets other criteria of the MFA process (not specified here), then security component 116 authenticates user 104 to the network associated with server 112, allowing user 104 a degree of access to server 112.

In an embodiment, because continual room size measurements may vary depending on the method and apparatus used to collect the data, the comparing security component may allow for small deviations of the received data from the stored data.

In embodiments, a security component, such as security components 114, 115, and 116, may be manifested in a number of different ways. For example, a security component may be a software module, a software application, or a software agent. The security component may reside locally in different forms, e.g., as an application on the device, or as a firmware residing within a trusted operating system of the device. The security component may be distributed, residing off a device, but be in networked communication with the device such that the distributed security component performs functions for the device as if located locally on the device. For example, component 116, executing on server 112, may perform one or more of the actions performed by security component 114 for device 102. Similarly, a security component may be distributed within a network 1060 (FIG. 10) and be in communication with a device such that the security component may receive data from the device, e.g., room measurement or signal strength data, such as a Received Signal Strength Indicator (RSSI), or Time of Flight (ToF) data, or other Indoor (or outdoor) Positioning System (IPS) data, process the data, make decisions regarding user continuity from the processed data, and, in accord with the decisions, communicate instructions back to the device. In other words, the functions associated with a security component, e.g., component 114, 115, and 116, may be distributed among a number of connected devices. And the security component functions for a single device, e.g., device 102, may be performed by software on a plurality of devices.

Figure 2:
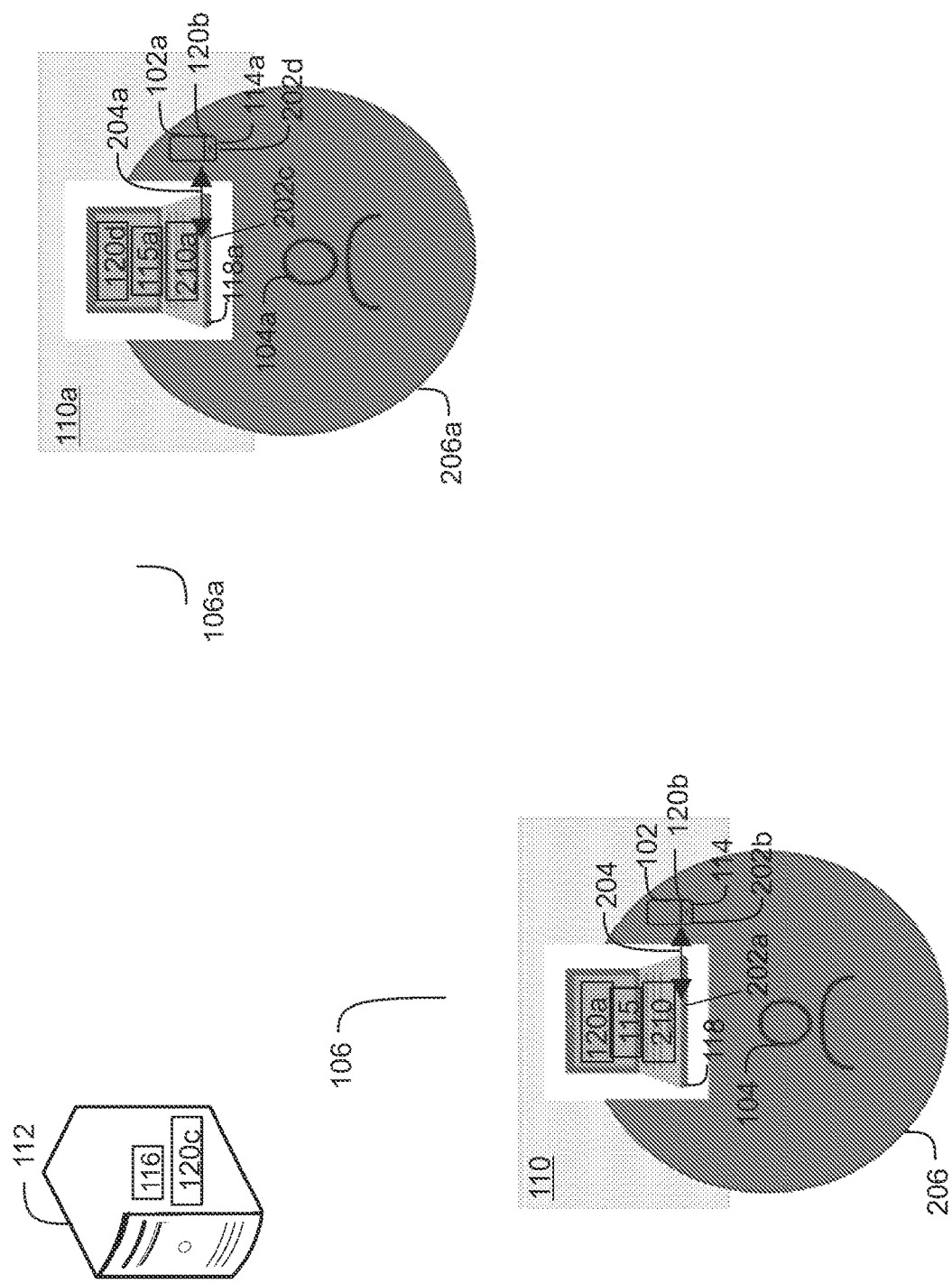
FIG. 2 is a schematic illustrating aspects of an embodiment employing user presence for authentication.

FIG. 2 is a schematic illustrating aspects of an embodiment of a system 200 employing user presence for authentication including computing devices 102 and 118. Most phones and laptops are currently equipped with a data-exchanging device 202a, 202b employing a communication protocol, such as Bluetooth or ultra-wide band (UWB, e.g., IEEE 802.15.4 (https://en.wikipedia.org/wiki/IEEE_802.15.4), which may provide for more precise distance measurements) that also provides ranging data. In the embodiment, at the device to which user 104 is requesting authentication (e.g., computing device 102), the security component (e.g., component 114) determines the relevant persona (as discussed before) and that, in room 106, the relevant persona includes user 104 being equipped with computing device 118. Security component 114 then automatically looks for and identifies the associated laptop (computing device 118) based on device type signals and identity information from the relevant persona. From data-exchanging device 202b, security component 114 acquires an accurate measurement of the signal strength between data-exchanging devices 202a and 202b without ever needing to connect to the device. It will then determine a distance 204 between the mobile device and laptop. In embodiments, security component 114 may be provided with distance 204 from data-exchanging device 202b directly. Distance 204 will change with relative movement between computing devices 102 and 118. As computing device 102 moves further from device 118, distance measurement 204 will increase. When security component 114 determines that distance 204 has exceeded a threshold distance, e.g., threshold distance 206, security component 114 determines that distance 204 has exceeded the allowable threshold 206 for authentication.

Regarding the lack of need for a connection between devices 118 and 102, in traditional wireless networks, a device may have to connect a "network" in order to use some function, e.g., a laptop must connect to a network in order to use the internet. When an embodiment simply needs to measure a signal strength of a signal emitting from a device, there is no need to connect the one device to another device in a way that allows data transfer between the devices. In such cases, the UPA, which could exist on either device, e.g., desktop 118 as component 115, or mobile communications device 102 as component 114, may receive signal strength data from the associated data-exchanging device 202a, 202b, without needing to form a connection to the other device.

In embodiments, a determination that distance 204 exceeds threshold 206 may be used in different ways. For example, an embodiment may rely on distance 204 being within threshold 206 as an initial criteria in MFA. The embodiment may require a first criteria (e.g., a username and password) in authenticating to computing device 102 and, upon retrieving the persona associated with the username and password, require as a second criteria that distance 204 be less than threshold 206. When distance 204 is determined to be less than threshold 206, then user 104 is authenticated to device 102. An embodiment may also rely on distance 204 being within threshold 206 as a subsequent, continuity criteria. In other words, the embodiment may require that, to maintain user 104 authenticated to device 102, distance 204 must remain at less than or equal to threshold 206. In the embodiment, when distance 204 is determined to exceed threshold 206, then security component 114 considers the event as indicative of a discontinuity in the presence of user 104 to device 118. As a result of the discontinuity of presence, security component may revoke some or all aspects of the authentication of user 104 to device 102. Thus, in embodiments, distance 204 may be used as an initial criteria in authenticating user 104 to device 102 or as a continuity criteria for maintaining the authentication of user 104 to device 102, or as both an initial criteria and a continuity criteria.

As described above, distance 204 was used as initial and continuity criteria in authenticating user 104 to computing device 102. However, in embodiments, distance 204 may be used by security component 115 to authenticate user 104 to computing device 118 in the same manner described above. Similarly, distance 204 may be used by security component 116 to authenticate user 104 to a network when user 104 requests authentication from either computing device 118 or 102.

In some embodiments, signal strength data regarding the connection between data-exchanging devices 202a, 202b may be used as initial and continuity criteria in authenticating user 104 instead of or in addition to distance 204. In such embodiments, a detected signal strength greater than a threshold signal strength may be required by security component 114, 115, or 116 as an initial MFA criteria, as a continuity criteria, or as both.

In some embodiments, a rate of change of distance 204 or of the underlying detected signal strength may be used as continuity criteria in authenticating user 104 instead of or in addition to distance 204 and the strength data itself. For example, it may be surmised by a sudden decrease in the signal strength or a sudden increase in distance 204 is indicative of a change of possession of computing device 102, which a security component 114, 115, or 116 may interpret as a failure of a continuity criteria. UWB signals are known to be inhibited by walls and similar structures. Thus, a sudden decrease in a UWB signal strength may indicate that user 104, or just device 102, has left room 106, or that user 104, or just device 102, has otherwise moved behind a partition significant enough to block the UWB signal. Such a partition may be inferred to be significant enough to block user 104's sightline to, or control of, computing device 118. Thus, the sudden decrease in detected signal strength may indicate that the proper user 104 is too far from computing device 118 to ensure control, or that an improper user has control of device 102 and a security component 114, 115, or 116 may interpret the rate of decrease in signal strength as a loss of control of one of computing devices 102 or 118 and consider this a failure of a continuity criteria. In an embodiment, a method for determining whether a continuity criteria is fulfilled includes: determining a rate of change of a detected strength of an emission of electromagnetic radiation from the first computing device or from the second computing device; and determining that the continuity criteria is not fulfilled includes a determination that the rate of change is decreasing at a rate above a threshold rate of decrease.

Figure 3:
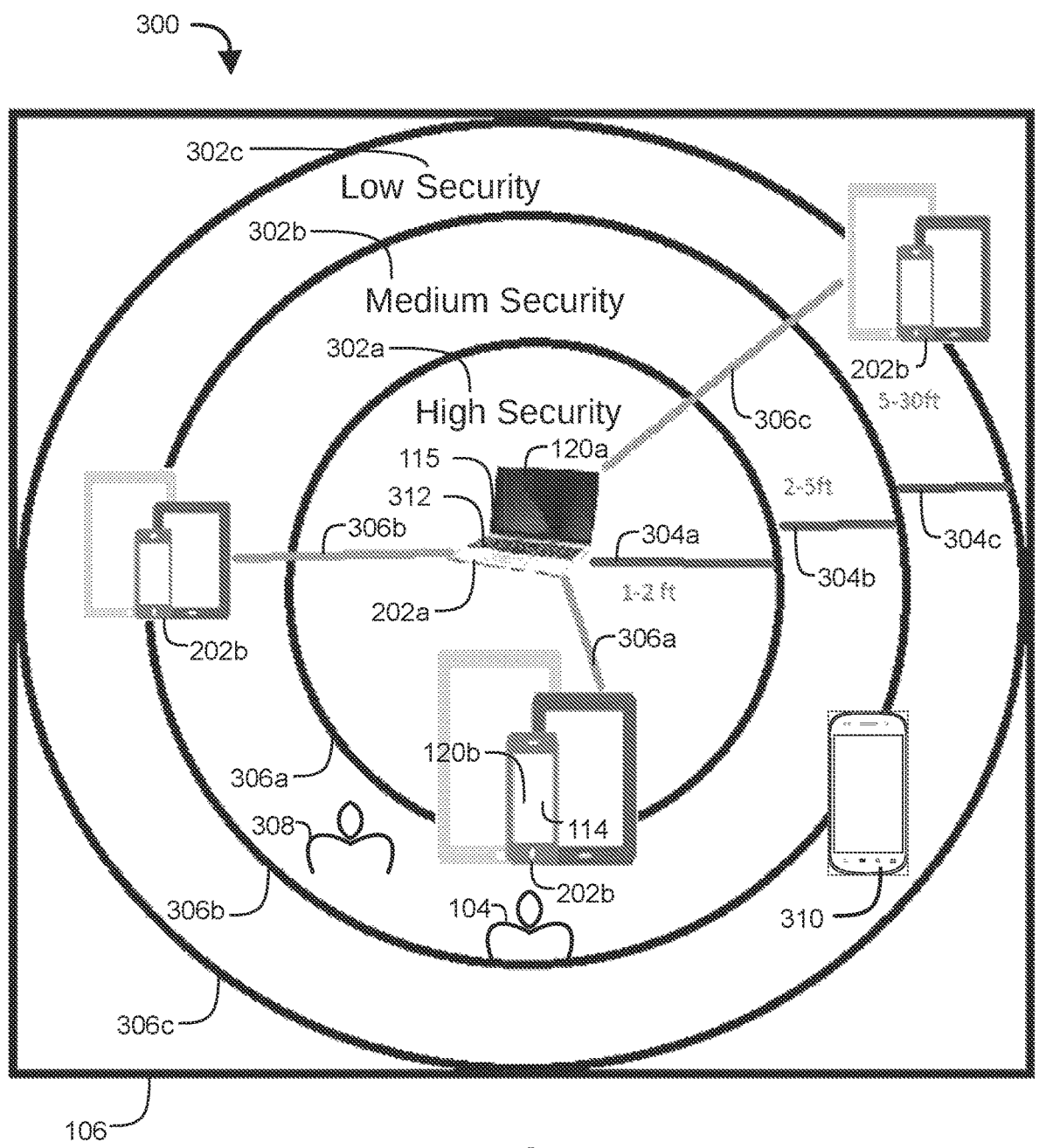
FIG. 3 is a schematic illustrating aspects of an embodiment employing user presence for authentication.

FIG. 3 is a schematic illustrating aspects of an embodiment employing user presence for authentication. In embodiments, the distances associated with proximity ranges may be determined using a total-length-of-room 106 measurement. The measurement may be taken into consideration when determining security radii 306a ... 306c for high 302a, medium 302b, and low security 302c levels. In the embodiment, a UPA application, e.g. security component 114, 115, or 116, may automatically create proximity ranges 304a ... 304c based on a measurement of room 106. The UPA may also allow for user or administrative tweaking. In the embodiment, upon the device powering up, determining a user persona, or the user opening a particular application, or upon some combination of these, the UPA may automatically request the user to acquire measurement data, e.g., data for room 106, as described above. With this data, the UPA may also automatically determine ranges 304a ... 304c for the associated security levels 302a ... 302c. In an embodiment, proximity rings may be automatically formed by a security component and adjustments to proximity ranges may be made using a visualization tool by administrators that are configuring the personal profiles.

In embodiments, a room may be measured in any of several ways. For example, an application may be used that takes an image of the room and extracts approximate measurements. A room may be measured by a person using a custom mobile application to walk around the room (e.g., an application that has UWB enabled on it), in order to take a precise measurement. A room measurement may use the technology that provides the device to device distance measurement, e.g., UWB or Bluetooth, to take a room measurement, e.g., after requesting that the more mobile of the devices be moved to a particular or maximum location. In embodiments, ranges may be determined "automatically" by relying on two UWB enabled devices to take the measurement. For example, if a laptop and mobile communications device are UWB-capable, a user may take the mobile communications device and walk around the perimeter of the room. The distance and positioning data may be measured between those two devices and the data used, e.g., by a security component, to create a map of the perimeter of the room. This creation of the map may be performed during, e.g., an initial registration of the user with continuous authentication.

In embodiments, UWB may be used to determine distance and direction between devices because it is able to precisely detect location; due to its distance-based measurement via time-of-flight (ToF). ToF calculates location based on how long it takes for pulses of radiowaves to travel from one device to another. While this typically works over relatively short ranges, the location of UWB signals can be determined with an accuracy of less than 50 centimeters (with optimal conditions and deployment), and extremely low latency. Other standards like BLE and Wi-Fi, typically determine location via less accurate and less reliable methods, such as received signal strength indicators (RSSI) that provide rough categories of "weak" or "strong" received signals and location accuracy on the order of one meter.

In an embodiment, security proximity ranges 304a ... 304c may be pre-determined. For example, a government agency may require that the mobile device be within two feet of the laptop device to be considered high security 302a. Additionally, a typical organization may only require it to be within the "medium security" proximity ring. These may be combined with the "personas" of the user for guarantees of further authentication assurance.

In an embodiment, proximity ranges, such as ranges 304a ... 304c, may be based on a type of environment, e.g., a room type, which may be retrieved from a persona, e.g., a persona associated with a particular user or device. In the embodiment, for a given persona and environment type, there may be a default setting for one or more proximity ranges. For example, when the environment includes a shared space, such as that found in an open office concept, the security component may automatically require high security level 302a and adjust proximity range 304a to a predetermined distance required to satisfy a requirement for an initial authentication, or continuity. For example, upon determining that room 106 is an open office concept environment, security component 115 may, for authentication or continuity, require that device 102 be within a two foot distance from device 118. In some embodiments, the security component may determine the environment directly from the persona. In some embodiments, the security component may determine the environment type from an image requested and received from a device.

In an embodiment, an environment type, e.g., a room type, may be associated with a persona. The environment type may be associated with default proximity ranges for different security levels. The security component may determine an environment type from the persona associated with a particular device or a particular user, or from device location data. Given the device persona, user persona, or both, and the environment type, the security component may apply the default proximity ranges as requirements that must be satisfied for authentication or continuity of presence, or both.

In an embodiment, a size of an environment type, e.g., a room size, or maximum room dimension, may be associated default proximity ranges for different security levels. The security component may determine an environment size from type from the persona associated with a particular device or a particular user, or from device location data, or from a measurement provided to the security component, e.g., as described above. Given the room size, the security component may apply default proximity ranges as requirements that must be satisfied for authentication or continuity of presence, or both. The default security proximity ranges may be determined, e.g., from a lookup table of proximity ranges based on environment size, as percentages of the environment size, or from a formula for proximity ranges based on environment size.

In an embodiment, default proximity ranges for different security levels may be applied based on both a persona and an environment size. Different environment types may be associated with different methods for determining proximity ranges based on the size of the environment. For example, a security component may retrieve an environment type associated with a persona and request data regarding the size of the particular environment. A first environment may have a lookup table associated with it. A second environment may have a formula for determining proximity ranges. And a third environment may have a different lookup table, or a different formula associated with it.

In embodiments, proximity ranges 304a . . . 304c may be selected by security components 114, or 115, dynamically in response to a risk level associated with an activity of the related computing device, e.g., a level of risk associated with data being displayed or otherwise accessed. Similarly, proximity ranges 304a . . . 304c may be selected by security components 114, or 115, dynamically in response to a risk level associated with the source of data being displayed or otherwise accessed.

An embodiment incorporates aspects of the embodiments discussed with regard to FIG. 1, FIG. 2, and FIG. 3. In the embodiment, a security component, e.g., component 114, identifies the distance between two computing devices, e.g., mobile device 102 and computing device 118 as discussed above, e.g., based on signal strength or time-of-flight. Based on this distance and the associated measurement, e.g., signal strength or time-of-flight, continuous authentication is lost if a change in the measurement indicates the user has left the vicinity, e.g., if the signal strength diminishes to be below a value associated with a threshold distance or the time-of-flight increases to be above a value associated with the threshold distance. The discussion regarding FIG. 2 includes additional details regarding the use of distance measurements. In this embodiment, the purpose of the room measurements disclosed with regard to FIG. 1 is to create contextual information based on the location of the user at the time that may be referenced later. There are multiple scenarios where initial room measurements may be applied later. In a first scenario, when the user is working from a corporate office, the security component will have determined the user location or persona from having monitored the device connection and determined the connection is to a corporate Wi-Fi or wired network. In such case, the security component would not request an additional measurement of the corporate office, since the dimensions are known. As a result, the threshold distance required, e.g., for authentication or to maintain continuous authentication, may be set to a default distance according to the associated persona. For example, when the distance between the mobile device 102 and computing device 118 is determined by security component 114 to exceed 10 feet, then security component 114 determines that the criteria for continuous authentication are not satisfied and acts accordingly, e.g., by limiting the access of device 102 or device 118 according to a policy associated with the active user persona. In another scenario, when the user is working from any location, other than a corporate office, the security component on the computing device, e.g., component 114 or 115, will ask the user to select a location, e.g. Hotel, Home Office, Coffee Shop, Airplane, etc. If the user selects Home Office, and it is during an initial registration, the security component requests the user to perform the measurement of the room as discussed with regard to FIG. 1 and the threshold distance criteria required to maintain continuous authentication set according to the room measurement and a policy associated with the Home Office persona. For example, if the Home Office measures to be 10×10 feet, then the threshold distance criteria required to maintain continuous authentication can be set to some distance related to the room size as determined by the Home Office policy. Perhaps the policy specifies a threshold of 80% of a maximum room wall length, or 8 feet. In this scenario, if the user gets up and leaves the room then the criteria for maintaining continuous authentication will be lost. Subsequently, upon the user returning to the home office and selecting Home Office, the initial measurement steps would not be necessary and the security component could set the threshold based on the initial measurement and a determination by the security component that the device has connected with a network associated with the Home Office persona. In this scenario, the threshold required to maintain continuous authentication may be set by policy that accounts for room size. For example, for a different room, e.g., a larger, second Home Office B with dimensions of 20×20 feet, after an initial measurement of Home Office B, the threshold distance using the same policy would be larger, e.g., 16 feet. Thus, if the user is in the larger Home Office B and 10 feet apart from the computing device, then the continuous authentication criteria will be satisfied. Again, if the user leaves the larger Home Office B then the distance between the computing device and the mobile device (user) will be larger than 16 feet and the criteria for maintaining continuous authentication will be lost. Subsequently, upon the user returning to the home office and, if the home offices are not differentiated by a network connection, the security component may prompt the user to select Home Office or Home Office B. Regardless of which is selected, the initial measurement steps would not be necessary and the security component could set the threshold based on the initial measurement and the user's subsequent selection of Home Office or Home Office B. This is an example of the same Home Office policy being applied to home offices of different dimensions to set criteria for maintaining continuous authentication that are tailored to the individual home offices. In an additional scenario, if the user selects the Hotel Room persona option, then the user will be prompted to measure the room as discussed and the threshold criteria required to maintain continuous authentication set by a policy associated with the Hotel Room persona. However, if the user selects a persona that, by policy, has been determined to be size independent, e.g., a Coffee Shop or an Airplane persona, then the associated policy may specify an arbitrary threshold distance for the criteria required to maintain continuous authentication, e.g., a threshold of 2 feet, and not prompt the user to measure the location.

Figure 4:
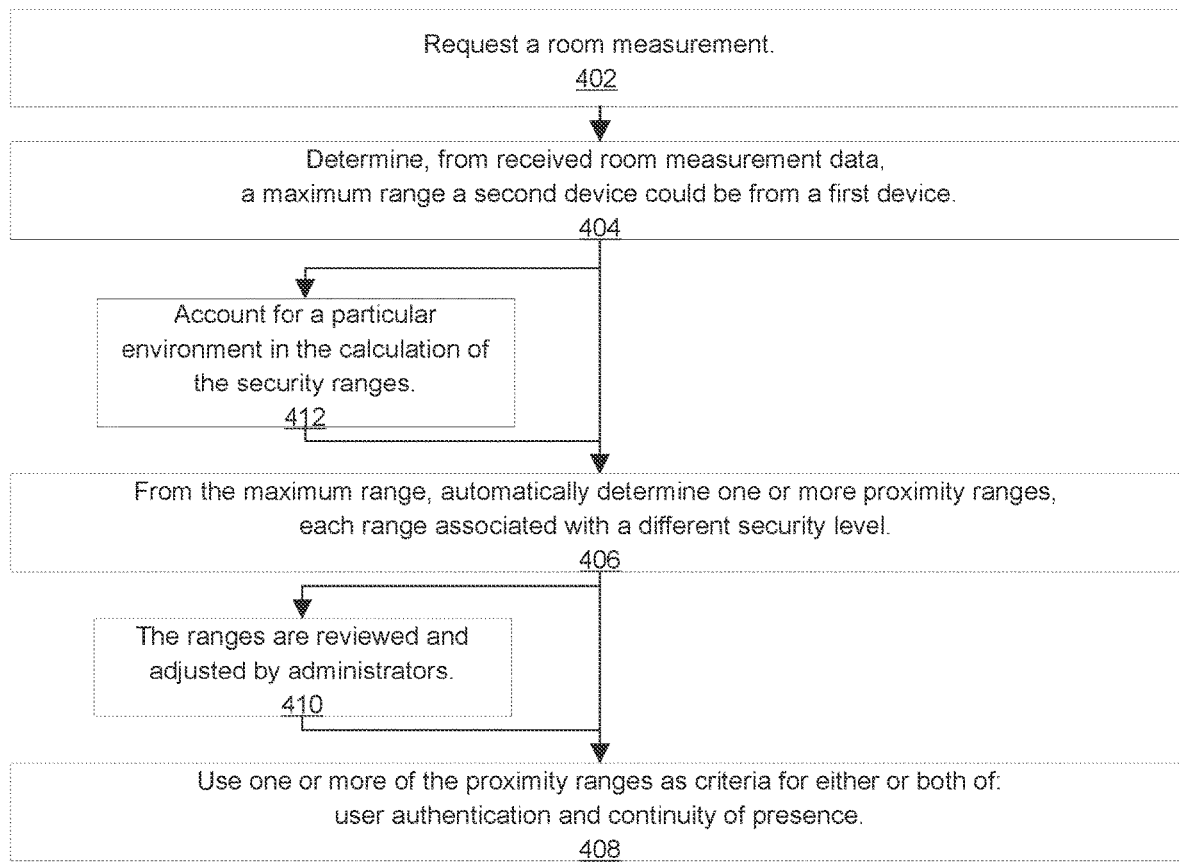
FIG. 4 is a flow chart of an embodiment of a method employing user presence for authentication.

FIG. 4 is a flow chart of an embodiment of a method 400 employing user presence for authentication. In a first step 402, a UPA on a device, e.g., 118, would request a room measurement. On receipt of the room measurement, in step 404, the UPA would determine a maximum range that a second device, e.g., 102, could be from the first device. With the maximum range, in step 406, the UPA then automatically determines ranges, e.g., ranges 304a . . . 304c, associated with different security levels, e.g., levels 302a . . . 302c. In step 408, one or more of the determined proximity ranges are used as criteria for either or both of: user authentication and continuity of presence. In an embodiment, the determination of the ranges may be based on a percentage of the maximum range, e.g., with a first range including up to 33% of the max range, a second range including from 33% to up to 67%, and a third range including from 67% to 100% of the maximum range. In an embodiment, in an optional step 410, the ranges may be reviewed and adjusted by administrators, e.g., using a visualization tool allowing the administrator to access range data created by the UPA. In an embodiment, administrators may adjust the ranges in the course of configuring a persona associated with the device, e.g., the persona for a particular user, or configuring the security profile of the device for a particular environment. In an embodiment, in an optional step 412, the particular environment may be accounted for in the calculation of the security ranges. For example, for shared spaces that did not include walls, such as the space found in an "open office" environment, the UPA may, upon determining that the particular space did not include walls, automatically adjust the security radius 306a associated with high security level 302a to be a pre-determined value associated with "open offices," e.g., a 2-foot distance between devices.

In an embodiment, a security component may dynamically adapt proximity ranges in response to the presence of an additional device or presence. With reference to FIG. 3, security components 114 or 115 may detect an additional presence 308 or device 310 and dynamically adapt proximity ranges 304a . . . 304c in response. The adaptation may be in response to the mere detection of the presence of the additional device or presence, and the adaptation may be in response to the detection of the presence or device, and a distance from the detected presence or device and one or more of devices 118, 102. For example, a security component may receive information from associated device 202a, 202b that the device has detected a new UWB or Bluetooth™ signal. Based on the detection of device 310 or on the detection of device 310 and a distance of device 310 from either of devices 118, 102, a security component may adapt one or more proximity ranges to account for the detected device 310. The security component may initially default to decreasing one or more of proximity ranges 302a . . . 302c under the assumption that the newly detected device negatively impacts the security of either device 118, 102. In an embodiment, the security component may receive information regarding device 310 from an application that interrogates any device within range, e.g., using Bluetooth™ and provides to the security component any information learned from the interrogation, or simply the signal strength (e.g., an RSSI, or ToF) associated with the Bluetooth™ or UWB signal of device 310, from which the security component may determine a distance the device it resides upon. In embodiments, the monitoring for other devices or presences, such as device 310 or presence 308, may be continuous or periodic. In an embodiment, the adaptation of a proximity range may be further adjusted as a result of an increase or decrease in the number of additional devices 310 or presences 308 detected. In addition, devices 310 may include devices such as mobile communications devices and laptops, as well as devices such as wireless networks employing Wi-Fi. In an embodiment, multiple additional devices 310 may be detected with the inference being that multiple additional presences 308 accompany the devices. As a result, the security component may adjust which of proximity ranges 304a . . . 304c to apply as a security requirement.

In an embodiment, a security component may address an additional device 310 differently when the security component possesses or obtains additional information regarding the additional device. For example, when device 310 has been previously registered with security component 114 or with a database accessible by security component 114, then security component 114 may determine not to adapt a proximity range after detecting device 310. Such may be the case when device 310 is associated with a relationship that is considered low-risk or otherwise favorable, such as might be found between user 104 and a family member or colleague, or with a known Wi-Fi router. In addition, when device 310 has been previously registered with security component 114 as a device increasing a risk factor, security component 114 may reduce one or more proximity range in response to the detection even more than if an anonymous device had been detected. In an embodiment, the security component may determine whether to adapt a proximity range based on a security level associated with a use of device 118 or 102. For example, the additional presence 308 or device 310 may be allowed when device 118 or 102 are performing low risk applications, such as gaming, but not when financial applications are in use. And, of course, the way we would do, that is, it would, it would be either admitting a unique identifier, or that we had registered, or we fingerprinted it uniquely is being that or we did a connection to it and determine that the signal strengthen that connection showed the same proximity, is what we have detected before therefore it's the same device.

In some embodiments, device 310 may be registered with security component 114 or with a database accessible by security component 114, i.e., device 310 may be made known to security component 114. For example, a security component, e.g., 114 may track and store information regarding devices to which it's associated device, e.g., 102, has been connected before. In other words, the security component has information associated with device 310. The information may be unique device identifier, e.g., obtained during a connection or a registration process for device 310, or a fingerprint obtained from signals emitted by device 310, or the information may be that device 102 previously connected to device 310 and device 310 has been tracked continuously by security component 114 since the connection. In an embodiment, information regarding a detected device may be considered by the security component only if the information was acquired within a sufficiently recent window, e.g., within the last three weeks. In embodiments, it is not necessary for device 310 to pair with device 118 or 102 for the security component 114 or 115 to obtain information regarding device 310. For example, devices 118 and 310 may have communicated with each other through a common cloud service that did not require them to pair to be able to communicate.

In some embodiments, presence 308 may be detected via reflection of signals, e.g., Wi-Fi signals. For example, it is known that radio frequencies and Wi-Fi signals may be used to detect the presence of moving bodies within a room. In such embodiments, a detection of presence 308 may be addressed as discussed above with regard to device 310.

In some embodiments, with the detection of device 310 or presence 308, the security component may respond by automatically adapting security proximity ranges, as described, or in other ways including one or more automatic or requested risk-reducing actions, e.g.: requiring additional authentication of user 104, notifying user 104 of the additional device or presence, prompting user 104 to move, minimizing or prompting the user to minimize a window, etc.

In some embodiments, the sizes of security proximity ranges 304a . . . 304c may contract or expand based on the relative sensitivity of data being displayed or accessed by device 118. For example, when security component 115 or 114 determines that data being displayed on device 118 is extremely sensitive, then the security component modifies proximity range 304a to be smaller than range 304a would be for less sensitive material. This modification may be performed even where both the extremely sensitive material and less sensitive material both require high security 302a. That is, the range 304a associated with high security level 302a may contract or expand depending on the material being displayed by device 118. For example, user 104 may open an application on device 118 and display material that security component 115 determines requires a contraction of proximity range 304a in order to maintain authentication or continuity of user presence. Subsequently, and using the same application, user 104 may change to displaying material that is less sensitive. As a result in the change of material, security component 115 may expand proximity range 304a, e.g., to its original value, or more or less than its original value, depending, again, on the sensitivity of the material being displayed. In this manner, proximity ranges 304a . . . 304c may expand and contract dynamically in response to a risk level associated with data being displayed or otherwise accessed. In an embodiment, the security component (i.e., UPA) may include capabilities, or integrations with Data Loss Prevention (DLP) solutions, that enable the security component to interpret the material being displayed by device 118, and, as a result, determine a required security level, and direct the adjustment of the proximity ranges 304a . . . 304c, or the upgrade or downgrade of a security requirement from one security range, e.g., 304b to a different security range, e.g., 304a or 304c.

Similarly, in some embodiments, the sizes of security proximity ranges 304a . . . 304c may contract or expand based on the relative sensitivity of data source from which information is being retrieved (for any reason, e.g., for display or for processing). For example, when security component 115 or 114 determines that the source of data being retrieved or displayed on device 118 is indicative of the date being extremely sensitive, then the security component modifies proximity range 304a to be smaller than range 304a would be for less sensitive material. This modification may be performed even where both the extremely sensitive source and the less sensitive source both require high security 302a. That is, the range 304a associated with high security level 302a may contract or expand depending on the source of the material being displayed by device 118. For example, user 104 may open an application on device 118 that security component 115 determines is a source of data that requires a contraction of proximity range 304a in order to maintain authentication or continuity of user presence. Subsequently, user 104 may change to using a different application that security component 115 determines is a source of data that still requires a high security level 304a, but the data source is less sensitive than the previous application. As a result in the change of data source, security component 115 may expand proximity range 304a, e.g., to its original value, or more or less than its original value, depending, again, on the sensitivity of the material being displayed. In this manner, proximity ranges 304a . . . 304c may expand and contract dynamically in response to a risk level associated with the source of data being displayed or otherwise accessed.

In some embodiments, security component 114 or 115 may require a particular proximity range 304a . . . 304c based on the relative risk of the function or use to which device 118 is being put. For example, when user 104 is initially authenticating themselves to device 304a, security component may require high security proximity range 304a, but, subsequently, when device 118 is sending a document to a printer, the security component may require only a low security proximity range 304c. In this manner, proximity ranges 304a . . . 304c may be selected by a security component based on the function or task being performed by the device.

In some embodiments, a security component may have control over access to an encrypted file and allow access to that encrypted file only when the user is being continuously authenticated. For example, with reference to FIG. 3, device 118 may be storing an encrypted file 312. In the embodiment, security component 115 may be given control over the access of file 312. Security component 115 may then monitor for an attempt to access file 312 and, when an access attempt is detected, permit the requested access to the encrypted file only if criteria for continuous user authentication are being satisfied. In the embodiment, the requested access may include a request to copy the encrypted file or an attempt to copy the encrypted file to a new location. In the embodiment, the requested access may include a request to decrypt the file or an attempt to decrypt the file. In both cases, the security component may permit or deny the request depending on whether user 104 satisfies the criteria, as described within this specification, for continuous authentication. A feature provided by such embodiments is that encrypted file 312 is protected security component 115 when devices 118, 102 are not connected to a network (e.g., network 1060, FIG. 10) and any associated network protections associated with encrypted file 312. For example, security component 115 may be given control over the access of file 312 using a form of Electronic Digital Rights Management (EDRM) in which security component 115 has access to files before their upload or download. Based on an analysis of the file by security component 115, and a determination by security component 115 of the sensitivity of the document, security component 115 may require the file to be encrypted before the upload or download.

In an embodiment, policies and personas have been provided, e.g., by an administrator or user, to database 120c and downloaded to device databases 120a, 120b, e.g., at the request or direction of one or more of security components 114, 115, 116. Thus, in embodiments, policies and personas in a device database, e.g., database 120a, may be accessed by the device security component, e.g., security component 115, when the device, e.g., device 118, is not connected to a network, e.g., server 112.

In some embodiments, methods of continuous authentication may be employed to control authentication of a user in cases including: user login onto a device; user interaction with data on a device; and user interaction with encrypted data on a device. An example of a use case in which continuous authentication may be used to continuously authenticate a user during interaction with encrypted data is a form of Electronic Digital Rights Management (EDRM). In this form of EDRM, when a document is uploaded or downloaded to a device, the document is scanned by the EDRM software component, e.g., security component 114, 115, or 116. If sensitive content is detected, the EDRM software component forces the file to be dynamically encrypted—either before it is downloaded to the endpoint device (e.g., as an encryted file 210, FIG. 2) that requested access to the file, or upon upload of the file from an endpoint device. An example of sensitive date includes Personally Identifiable Information (PII) data. The encryption may be requested or performed by the security component performing the scan. Once encrypted, for a user to interact with the file, the user device must have software component that is associated with the component that initiated the encryption, e.g., software components 114, 115, or 116, and that is also installed on the user device. Upon the use trying to access the encrypted file, the security component will request that the user be authenticated in order to access the contents of the file. In embodiments, the "access" of the contents of the file may include any type of file manipulation, including uploading, downloading, and opening the file. Embodiments of continuous authentication may be beneficially employed with EDRM when a user attempts to access an encrypted file in both on-line and off-line modes.

With on-line EDRM, methods of continuous authentication may be used in which the local security component, e.g., components 114, 115 or the network-based component, e.g., component 116, or both control the continuous authentication.

With off-line EDRM, methods of continuous authentication may be used in which the local security component, e.g., components 114, 115, control the continuous authentication. This off-line ability for continuous authentication with EDRM is a desirable feature as it is an improvement to typical off-line EDRM. With typical off-line EDRM, the EDRM component provides a one-time ticket, or a limited time window, or something such as a special pass code or a pin, which, when the user is off-line, is checked by the local EDRM component to ensure that the actual user is using the device, i.e., to authenticate the user. However, when the EDRM service is cloud-based and the device is off-line, even if a user has the ability to provide requested credentials, it is not possible to authenticate the user because the device is off line. In contrast, with some embodiments of continuous authentication, the local security component or components 114, 115, may perform continuous authentication without requiring network access, because some embodiments of continuous access require local elements, such as user 104 and devices 102, 108, which may be checked and verified locally, without having network access. Thus, the ability of continuous authentication to be used during such off-line EDRM sessions greatly improves the security of off-line EDRM.

Similar to the use-case described regarding EDRM, methods of continuous authentication may be used in which the local security component, e.g., components 114, 115 or the network-based component, e.g., component 116, or both control the continuous authentication in a Cloud Access Security Broker (CASB) or a Secure Web Gateway (SWG), in which security components 114, 115, 116, may enforce policies in databases 120a . . . 120c. In such cases, embodiments of continuous authentication may be employed to log user 104 into device 102 or 112. In embodiments, when user 104 is attempting to access sensitive data, policies and personas may provide direction to components 114, 115, 116 to automatically adjust security settings, such the dimensions of security proximity ranges 304a . . . 304c to be smaller or larger in accord with a security assessment of the accessed data. A response by a security component, upon detecting an access or attempted access of sensitive data, may also include an institution of a continuous authentication requirement when no such requirement was in effect prior to the access or attempt. For example, when a CEO is working at home, and a "home" persona is being followed by a security component, the home persona may generally accept a relatively great distance between devices 102, 118 and still consider the user as satisfying a continuous authentication requirement. However, if the begins to interact with sensitive financial data on device 118, perhaps an attempt to download a document that has particularly sensitive data, an embodiment may, upon detecting the attempt, automatically modify one or more requirements for continuous authentication. For example, security component 115 may change distance 304a that device 102 must be within to satisfy the continuous authentication requirement, or reduce a window of time that user 104 may be beyond distance 304a and still maintain continuous authentication. Security component 115 may even essentially require that device 102 by immediately next to device 118 to interact with the sensitive data. The change to the authentication requirements may be communicated to user 104 through the CASB or SWG interface, which, e.g., may request user 104 to move such that device 102 is maintained nearer device 118.

In an embodiment, device 118 may represent an automobile and device 102 may represent a key fob, the presence of which is necessary for user 104 to use device/automobile 118. In the embodiment, the methods discussed within for continuous authentication may be employed to authenticate user 104 to device/automobile 118 so that user 104 may access the features of device/automobile 118 The intention behind this embodiment is to help mitigate vehicle thefts. Attackers are leveraging signal amplification and manipulation with man-in-the-middle devices to amplify the signal from the key fob within a house to respond to starting the car from a larger distance. Thus, embodiments of methods for continuous authentication may be used to thwart the attacker. For example, a proximity range such as range 304a may be required between the fob and auto. As discussed previously, the determination of distance between fob and auto may be measured using a number of methods, including providing the fob and auto with UWB and/or Bluetooth capabilities and leveraging their distance-determining capabilities.

Figure 5:
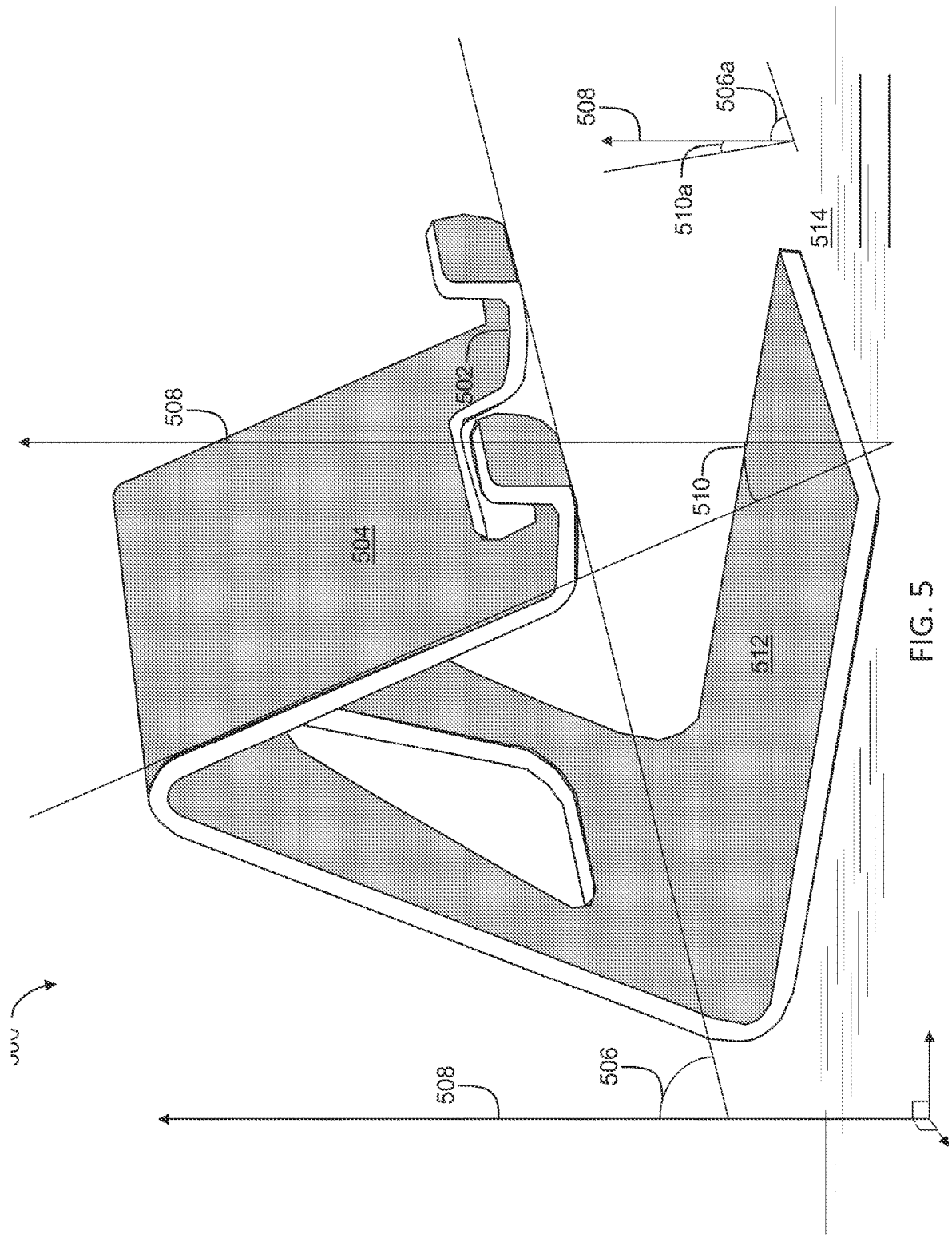
FIG. 5 is an illustration of aspects of an embodiment employing user presence for authentication.

FIG. 5 is an illustration of aspects of an embodiment of a dock 500 for employing user presence for authentication. In embodiments, dock 500 may be employed to indicate user presence instead of, or in addition to, other methods of indicating user presence. For example, when the size of room 106 is too large for practical measurement, or because context data indicates a Travel persona for user 104, user 104 may be requested by a security component to place computing device 102 in dock 500. In FIG. 5, dock 500 includes a cradle 502, a face 504, and a base 512. Cradle 502 may be inclined a custom angle 506 with respect to a vertical axis 508. Face 504 may be inclined a custom angle 510 with respect to vertical axis 508. Angles 506, 510 may be in planes that are orthogonal to each other. Dock 500 may be provided with randomized or even unique angles 506, 510 to create variation and to mitigate situations where a specific phone with a specific dock angle is imitated by an attacker to authenticate a device. Thus, when computing device 102 includes 3-dimensional orientation sensor (e.g., a gyroscopic sensor) and is placed in dock 500, computing device 102 may determine specific angles 506, 510. Security component 114, 115, or 116 may then query computing device 102 to determine angles 506, 510. Upon receipt of the angle data, the security component may the provided angle data to context information associated with the relevant user persona. When the provided angle data matches the angles from the context information, then the security component determines that the criteria is fulfilled. Otherwise, the security component determines that the criteria is not fulfilled and the user may not be authenticated using this criteria.

In an embodiment, it is recognized that base 512 may not rest upon a surface 514 that is horizontal. In such an embodiment, the security component may request an initial measurement of the plane of surface 514 to determine correction angles 506$a$ (in the plane of angle 506), 510$a$ (in the plane of angle 510) to be used to correct angles 506, 510, respectively, to create corrected angles 506', 510', which would then account for any deviation from the horizontal and provide an accurate representation of the geometry of dock 500 for comparison against axis 508.

In embodiments, measurements of room and/or the angle of the phone, e.g., as discussed with regard to FIG. 1 and FIG. 5, and of data associated with the use and location of computing device 102, may be employed to create a user pattern and store the pattern as context data associated with a user persona. Subsequently the security component may compare current user context data against stored user context data to, e.g., determine a relevant persona, or to determine whether an authentication criteria is fulfilled regarding somewhere a user is.

In embodiments, abnormalities in user patterns and behaviors may be recognized by the security component comparing user behavior against stored context data in a relevant persona. For example, in an embodiment, when an employee has their phone in their pocket and is traveling (as on an errand or to a different room), the employee cannot authenticate to their work-related devices or applications, where authentication requires measurement data associated as discussed with regard to FIG. 1, distance/strength data as discussed with regard to FIG. 2, or inclination data as discussed with regard to FIG. 5. This embodiment prevents employees from performing work while doing activities like driving a car (improving safety), and enforces stronger authentication for high security environments.

In an embodiment, with security component 114 installed on computing device 102, security component 115 on computing device 108, and security component 116 on server 112, any or all of the measurements of room, distance, signal strength, and inclination may be synchronized with a Cloud Service continually. A plug-in may be created for commonly used email clients that are corporate-connected. As these measurements will not typically change when the user is actually using the computing device 118, the security component or components may detect quickly if the user (with their device) has left the room. As a user typically carries their phone with them at all times, authentication using such a computing device to determine whether one or more authentication criteria are fulfilled will accommodate most scenarios.

In an embodiment, security component 115, on computing device 118, may be integrated with login capabilities so that when user 104 enters room 106 with computing device 102, computing device 118 may be automatically unlocked based on corporate policy configuration for computing device 118, and depending on one or more of the measurement of the room by computing device 102, the connection of computing device 102 to computing device 118, or by computing device 102 being placed in the angled dock 500.

In an embodiment, an accommodation may be made for user 104 when the user needs to be authenticated to computing device 102 and cannot use dock 500. For example, user 104 may be traveling and actually in motion, or may wish to hold computing device 102. In the embodiment, the accommodation includes security component requesting a different form of authentication criteria. For example, when user 104 is within room 106, the security component may accept one or more room dimensions, or images of the room (as discussed with regard to FIG. 6). The security component may also accept evidence of "something you are" as discussed with regard to FIG. 7 and FIG. 9. Furthermore, in an embodiment, the security component may perform a voice verification against previously registered user voice data, or a video verification of the user against previously registered user image data. And, in an embodiment, the security component may limit the length of time that user 104 may access the computing device, or limit some other aspect of access (e.g., including limiting an aspect of computing device access or an aspect of network access) when an accommodation is made to accept an authentication criteria different from the originally requested authentication criteria.

Figure 6:
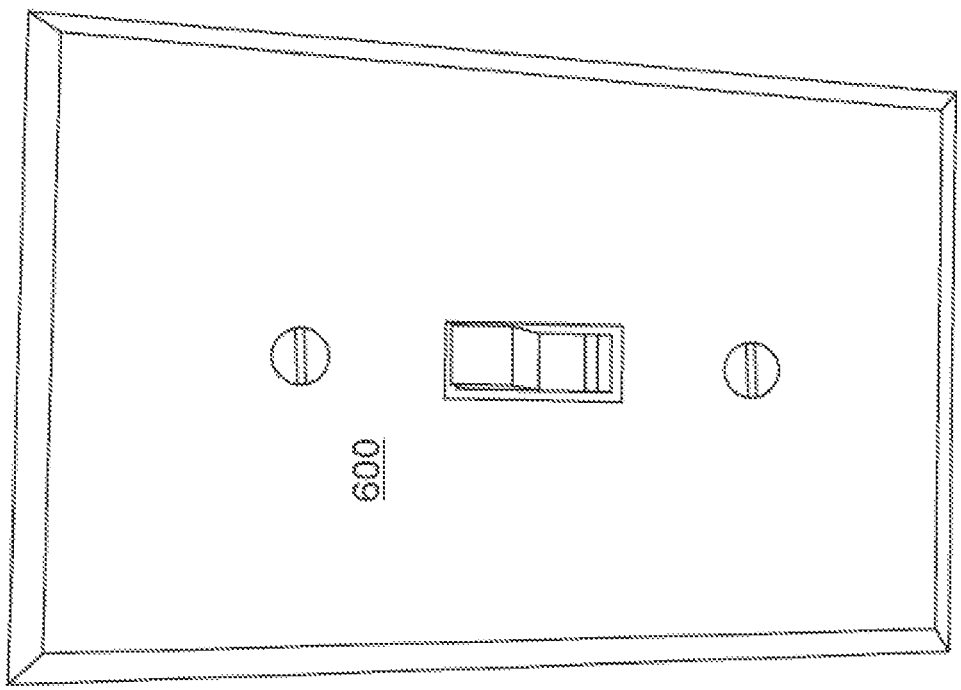
FIG. 6 is an illustration of aspects of an embodiment employing user presence for authentication.

FIG. 6 is an illustration of an aspect of an embodiment employing user presence for authentication. In the embodiment, an employee who is regularly working from the same room may register an "image" or "images," e.g., a light switch 600, within the room to provide evidence of "somewhere you are." Such a registered image may be compared against an image requested during a periodic security check or validation that the user is present within the room. For example, lights switch image 600 may be registered during an initial setup and associated with the relevant user persona and accessible by security components 114, 115, or 116. In an embodiment, user 104 may be requested to re-acquire and send an image of the original feature for comparison by the security component against the registered image. The request for re-acquisition of the image may be made periodically. In an embodiment, the time lapse between requests may be decreased or increased to reflect increased or decreased security needs, respectively. In an embodiment, the re-acquisition of the image and comparison may be requested when other criteria, e.g., accurate room measurements or real-time room measurement, are not available to the security component. In an embodiment, for privacy considerations, image 600 may be stored locally, e.g., on computing device 102, and 118, and the subsequent comparison performed locally by security components 114, or 115. Also, image 600 may be stored encrypted, e.g., with AES512 encryption.

Figure 7:
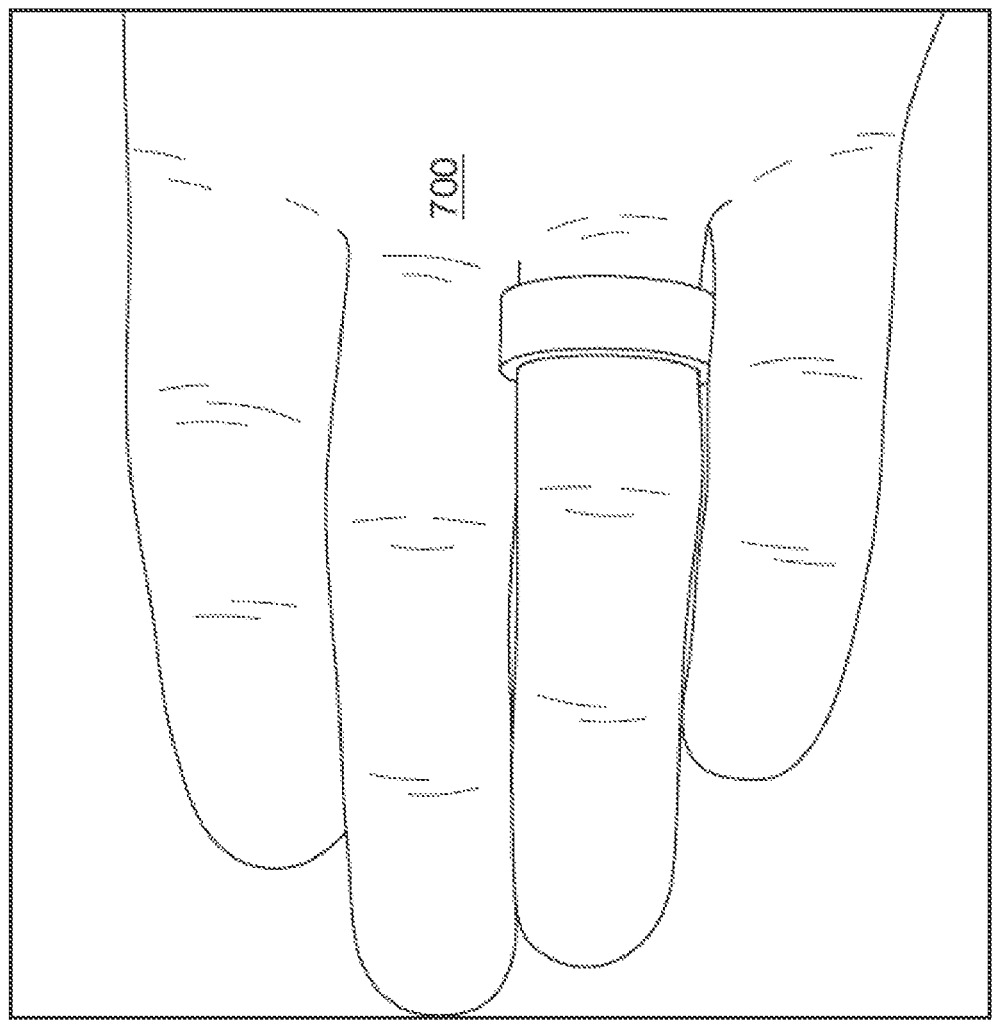
FIG. 7 is an illustration of aspects of an embodiment employing user presence for authentication.

FIG. 7 is an illustration of an aspect of an embodiment employing user presence for authentication. In FIG. 7, similar to FIG. 6, user 104 may register an image 700 as evidence of "something you are." The relevant section of image 700 may be different in different embodiments. In an embodiment, the relevant data may include the presence, dimensions, and color of the ring. In an embodiment, the relevant data for comparison may include biometric data such as one or more fingerprints, finger dimensions, or skin crease locations. Such an image may be requested. Image 700 may be requested processed as discussed with regard to FIG. 6 and for the same reasons.

In an embodiment, user and entity behavior analytics (UEBA) elements may be a criteria used to maintain an authentication of user 104 to a computing device, e.g., to keep sessions alive and appropriately determine termination intervals.

Embodiments generally provide a plurality of methods with criteria that may be used to authenticate a user to a device, which reduces or eliminates the need to rely on a single criteria, such as the traditional "something you know," e.g., a password. In an embodiment, and of the different authentication criteria may be used as parts of an initial MFA to a device. In an embodiment, once a user is authenticated to a device (e.g., via a daily initial authentication), the embodiment may rely any of the authentication criteria, including one or more of "somewhere you are" (as discussed with regard to, e.g., FIG. 1 and FIG. 6), "something you are" as discussed with regard to FIG. 7 and FIG. 9, "something you have" (as discussed with regard to FIG. 2), or "something you do," to provide continuous authentication.

Regarding the creation of personas and administrative policies, it was discussed earlier that there may be four "work" personas: Working from a corporate office ("Corporate"); Working from a home office ("Home"); Working from a shared office (Starbucks, Shared Space) ("Shared"); and Working while traveling ("Travel").

In embodiments, personas may be associated with policies based on worker type, or industry type. Personas may also be associated with policies that determine which criteria to use in an authentication, e.g., which of the various "somewhere you are" authentication criteria to use in an authentication. These may be developed as part of a registration process.

In an embodiment, when an employee registers with the security component (e.g., a UPA), they are asked a series of questions that determine their typical work persona or personas. These questions may also be used as baselines for later comparisons to determine abnormalities in work pattern behaviors. A few examples of the questions asked when registering with the security component include: Do you often work in the same room most days? How often do you travel for work? Do you often work in a shared public space such as Starbucks or at a Library? The security component then determines appropriate personas for the employee based on the answers. The context information may be stored and retrieved by the security component when an authentication of the user is requested. In this manner, context information may be associated with a specific user persona and used by the security component to compare against new context information to determine the relevant user person.

In an embodiment, the security component may leverage integrations via API connections to common corporate human resource information systems (HRIS, e.g., ADP, Workday) to perform a user lookup and use information gathered from the user lookup to formulate, using the answers to the registration questions above and properties discussed below, a user presence security profile and associate the security profile with the user. The security component, when connected to the HRIS system, may query HRIS user properties, e.g.: a user's "office" field location value (e.g.: Remote, California, Virginia, Maryland); a user's "department" field value (organizations may want certain departments to have a more restrictive user presence security profile); and a user's "country" field value (organizations may want specific countries to have more restrictive user presence security profiles).

In an embodiment, a user presence security profile may have different security levels, e.g.: High (restrictive—highest level); Medium (default unless configured); and Low (lax requirements).

Administrative input may provide further context information regarding the user. An organization may use administrative input to input context information such as: an organization "type"; a department "type"; and a "country" value. Regarding an organization type, this may be useful when, e.g., a government organization wishes to default their user presence security profile for all employees to a high security level. Regarding a department type, administrators may configure specific departments with specific user presence security profiles default values. For example, an organization may configure that all executive department members default to a high security level. The intelligence team may also default to a high security level. Other organizations such as marketing may default to a medium security level. Thus, a department type input allows an organization the flexibility to determine which user presence security profile level should be applicable depending on the department type, which conveniently provides for enforcing a particular security level department-wide. Regarding a country value, an organization may want employees residing in a particular country to, by default, have a particular security level. Thus, for a particular persona, the persona, plus the HRIS Integration Data, plus configurable administrative input may be processed by the security component to formulate a user presence security profile.

In an embodiment, the security component may provide suggested security profiles for organizations based on a combination of the work personal and HRIS data. For example, the security component may determine from the HRIS integration data and the employee's questions that the employee will always be working from home. As a result, the security component may suggest a certain security profile. If an organization (i.e., an administrator) agrees that the suggested security profile is appropriate for the home work persona, the organization may choose to use the suggested security profile rather than a default security profile (e.g., a purely administratively configured security profile). Thus, the suggestion of a security profile adds flexibility to the User Presence Security Profile that may be applied.

In embodiments that employ an embodiment of "somewhere you are" as a criteria in an authentication process, the security component may perform a pattern analysis process to analyze changes in measurement(s) and room size discrepancies. The pattern analysis may be used by the security component in determining which of the several employee personas is the relevant persona. The security component may also intermittently check the HRIS system for departmental or location changes to determine if the employee changes departments or locations. When the check results in receiving updated context information, the security component may use it to modify an existing persona, or create an entirely new persona. Such checks and updates will result in the security component providing information that may determine if an employee's suggested security profile should be altered over time. For example, a policy administrators may receive notifications in a centralized management console when such updates occur. The organization may determine that policy administrator review and confirm such updates, or may determine that employees accounts should automatically update to the new suggest security profile. Thus, the embodiment allows an organization to: allow an employee's behavioral (i.e., context) changes to determine new security profiles, which reduces the administrative workload; or always allow an employer direct control over security profiles such that changes to an employee's security profile occur based only on changes to HRIS data, instead of changes to the security profile as a result of changes to Work Persona context and/or HRIS data.

Embodiments of user presence security profiles may be as follows. A high level security profile may be suitable for government agencies, specific departments in an organization, or other organizations who want employee authentication level to be restrictive. Exemplary criteria for authentication of an employee with a high level security profile may include: the employee must wear a UWB based wrist-watch and be within a "10" value (a measure of distance or signal strength) between the UWB based wrist-watch and primary authentication UWB device (laptop) (e.g., as discussed with regard to FIG. 2); the employee must situate the mobile device (e.g., computing device 102) on the company owned mobile-dock (e.g., dock 500) and leverage the mobile devices gyroscope to verify positioning (e.g., as discussed with regard to FIG. 5); the employee must record a voice sample and translate to high (non-audible frequency) and perform ongoing synchronization of audio frequency between the mobile device and the laptop.

A medium (default) level security profile may be suitable for most organizations who want employee authentication level to be balanced. Exemplary criteria for authentication of an employee with a medium level security profile may include: the employee must be under a "20" value between the UWB based mobile-device and primary authentication UWB device (laptop); the employees must register "security image" in the room they are working from and periodically scan this image (once per week). Additional options may be possible that require fewer criteria be fulfilled for initial or continuing authentication. For example, authentication criteria may instead require a room measurement value registration plus a periodic check, or the employee may be required to record a voice sample and translate to high (non-audible frequency) and perform ongoing synchronization of audio frequency between mobile device and laptop.

A low level security profile may be suitable for specific work personas such as Home, or Corporate, or Travel. Exemplary criteria for authentication of an employee with a low level security profile may include: the employee must be under a "20" value between the UWB based mobile-device and primary authentication UWB device (laptop); r the employee must leverage the mobile device in dock positioning, or provide a periodic security image verification, or room measurement, or may be required to record a voice sample and translate to high (non-audible frequency) and perform ongoing synchronization of audio frequency between mobile device and laptop.

Figure 8:
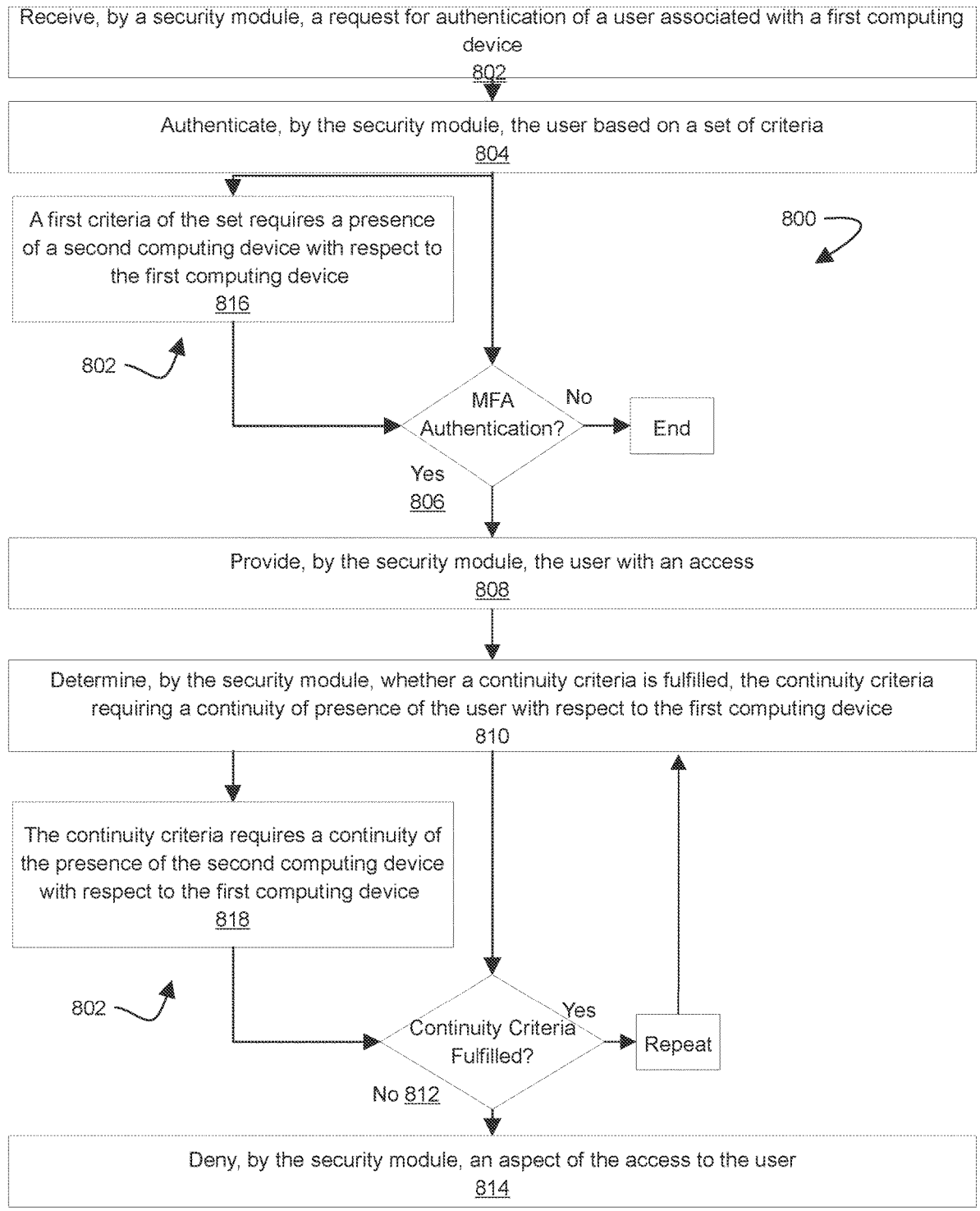
FIG. 8 is a flow chart of embodiments of methods employing user presence for authentication.

FIG. 8 is a flow chart of embodiments of methods employing user presence for authentication. A method 600 employing user presence for authentication may include the following steps: a step 802 of receiving, by a security component, a request for authentication of a user associated with a first computing device (e.g., computing device 102 or 118 and the request could be received by any of security components 114, 115, 116); a step 804 of authenticating, by the security component, the user based on a set of criteria (e.g., an MFA); as a result of the authentication 806 of the user, a step 808 of providing, by the security component, the user with an access (e.g., this could be complete access to the computing device from which the request originated, complete access to a network represented by the security component, or less than complete access to either. That is, the type of access granted could depend on a persona associated with the request for authentication); a step 810 of determining, by the security component, whether a continuity criteria is fulfilled, the continuity criteria requiring a continuity of presence of the user with respect to the first computing device (e.g., the continuity criteria could be any of the criteria—the tests for user presence—described with regard to FIG. 1-FIG. 9); and when the determination is that the continuity criteria is not fulfilled 812, a step 814 of denying, by the security component, an aspect of the access to the user (e.g., this could be the denial of any or all aspects of the access provided initially).

Furthermore, in a method 802: step 804 of authenticating, by the security component, the user based on a set of criteria, in the path to MFA Authentication, may have the additional requirement 816 that a first criteria of the set requiring a presence of a second computing device with respect to the first computing device (e.g., an MFA where one of the MFA criteria requires a second computing device in addition to the device from which the request originated. That is, the first criteria may require the presence of both computing device 102 and computing device 118); and step 810 of determining, by the security component, whether a continuity criteria is fulfilled, in the path to whether the continuity requirement is fulfilled, may additionally require 818 a continuity of the presence of the second computing device with respect to the first computing device (e.g., the continuity criteria could be any of the criteria described with regard to FIG. 1-FIG. 9 that require the presence of both computing device 102 and computing device 118).

In some embodiments, acoustic waves may be used in methods for authentication and detecting user presence as follows. During a user enrollment process, e.g., within the series of questions that determine their typical work persona or personas, a user may be prompted to speak when pressing the "record" button on the device. The resulting recording is then converted to an inaudible frequency range. For example, a typical voice frequency range is 80 to 255 Hz and the typical telephone frequency band is from about 300 to 3400 Hz. The recorded frequencies are shifted to a higher, inaudible frequency range, e.g., the 20,000 to 23,000 Hz frequency range that is above the range of typical human hearing. This frequency conversion may be accomplished using well-known means of amplitude or frequency modulation, or related means. The purpose is to not allow the user to hear any subsequent transmission of the converted recording. Rather, the purpose is to create an acoustic file that may be used by a security component in determining user continuity of presence. It may be that the original recording is stored and converted in advance of each user session, or that the original recording is immediately converted and the conversion stored for future use, or both. The converted recording of the user's voice may optionally have an additional sound or sounds added, which may be unique for the particular authenticated session. For example, the additional sound may be added at the time of the enrollment process or later. The additional sound may also be added in any number of ways. For example, the additional sound may be mixed with the original recording before the frequency conversion, or mixed with the acoustic signal or file that resulted from the frequency conversion.

In the embodiment, after a user has authenticated to a device (e.g., desktop 118), the converted recording may be continuously or periodically played to ensure that the devices (e.g., desktop 118 and authenticating device 102) are in acceptable proximity. For example, security component 115 may instruct computer 118 to play the converted recording. Security component 114 may receive data of the detection of the broadcast of the converted recording from a microphone on computing device 102. Frequency aspects of the received data may be compared to the converted recording to confirm that the source was actually computer 118. After the source is confirmed, data regarding the intensity of the received data may be compared to data regarding the intensity of the converted recording at its source, device 118 to determine a distance of computing device 102 from computer 118. When the distance between devices is determined, security component 115 may use that distance data as described in any method in this description, e.g., to determine whether the distance between devices satisfies a continuity of presence that is based on device proximity.

For example, security component 115 may receive data of the detection of the broadcast of the converted recording from a microphone of computing device 118. The data may include a measure of the broadcast converted recording at the source computer 118, such as a sound pressure level, or sound power, or some, or an amplitude, such as an amplitude at a particular frequency. Security component 114 may receive data at the receiving computing device regarding the same measure of the broadcast converted recording, and communicate that data to security component 115. Security component 115 then may compare the measurement data of the broadcast recording at the source (computer 118) to the measurement data of the broadcast recording at the receiving device (device 102). In an embodiment, the distance determination may be made using the inverse square law to compare the intensity data at the source microphone (using a known distance r1 of the microphone to the computer speaker, and measured intensity I1, to determine a sound power P) to the intensity data at the receiving microphone (using determined sound power P, and measured intensity I2, to determine a separation distance r2). With r2 now known, security component may compare that distance to any applicable proximity range, e.g., 306a . . . 306c, to determine whether a continuity of presence criteria is satisfied. In embodiments, measurement data may be compared by any participating or controlling software component 114, 115, or 116, after it has received both data sets. In embodiments, a recording by one security component, e.g., security component 114, may be provided to other security components, e.g., components 115, 116. Thus, a recording performed on the first device 118 may be broadcast from either device 102, 118 for determination of the distance between the devices 102, 118.

In an embodiment that may be implemented during a video teleconference in which multiple users join in from multiple devices, a different acoustic file may be received from each of a plurality of devices 102 and broadcast by a security component in parallel (for devices known to be acoustically separated) or in series (where devices may be near each other) to determine a continuity of presence for each of the plurality of devices. For example, with reference to FIG. 2, user 104 may authenticate to device 118 using device 102, and user 104a may authenticate to device 118a using device 102a. Security component 116 may receive a first acoustic file associated with device 102 and a second acoustic file associated with a second device 102a. Security component 116 may determine that users 104 and 104a are acoustically separated, e.g., by a review of user personas, or location information regarding devices: 102 and 102a; or 118 and 118a; or both. In such case, both of devices 102 and 102a could be instructed to broadcast the respective converted recordings at the same time without confusing the signals. On the other hand, security component 116 may determine that users 104 and 104a are acoustically nearby, or may not be able to make a determination as to their relative nearness. In such case, device 102 and device 102a may be instructed to broadcast their respective converted recordings at different times so that the signals are not confused.

In an embodiment, multiple recordings (e.g., from multiple users 104, 104a) from different devices (e.g., devices 102, 118, 102a, 118a) can be detected on the device and associated with the respective user during a registration performed by the software component on the device (e.g., by component 114 when device 102 performed the recording), or otherwise involved in the process (e.g., by component 116, when device 102 performed the recording and communicated the recording to device 112). For example, once the recording is made on one device (either PC 118 or mobile device 102) the recording may be registered by the software components 114, 115, 116, and can be re-emitted from either device, 102, 118, or by a device as instructed by software component 116. How often the emission occurs from either device is configurable by an administrator. These emission recordings will preferably be sensitive to animal frequencies so as to not injure or cause harm to pets. This embodiment may only be suitable for specific "Profiles" such as the "Home" profile or "Travel" profile. This may not be a suitable solution when multiple people are in a shared space (for example).

In addition, embodiments of methods to detect distance may be combined. For example, a method may receive distance data provided using the acoustic embodiment just described and distance data provided using UWB. If the distance measurements differ, the embodiment may default to using one of the distance measurements. The default may change according to a security level requirement. For example, when high security is required, the embodiment may default to the distance measurement that indicates a greater distance between devices, which would be a more conservative approach that would likely result in greater security. In comparison, if a low security was required, the embodiment may default to the distance measurement that indicated a lesser distance between devices, which would be a more liberal approach that would likely result in less dropping of a connection due to loss of continuity of presence.

In an embodiment, authentication may employ a push mechanism and sound. In the embodiment, after a user has initially authenticated to a first device (e.g., device 118) or an application associated with the first device, a security component associated with the device (e.g., component 115, or 116) may determine, e.g., from a user persona, or from the log in itself, the identity of a second device associated with the user (e.g., device 102). With this information, the security component may push a notification to the second device (in an embodiment, the push notification does not require the second device have an associated security component, though it may have a security component, e.g., component 114). The push notification may include a code that must be entered into the first device to confirm that the second device is nearby. Upon user entry of the code, and its receipt by the security component 115, 116, the security component instructs the second device to emit a sound known to the security component. For example, the sound may be a random sound developed by the security component at that moment, associated with the user, and pushed to the second device. The random sound may be ultrasonic or sonic (e.g., a user-specific tone that the user may choose to announce themselves to a teleconference). Then, after: the second device emits the sound in response to the push notification, the sound is received by a microphone of the first device; the security component 115, 116 compares the received sound to the sound from the instruction; and the received sound matches the sound from the instruction, the security component may use the receipt of the sound as discussed in this disclosure to authenticate the user—either as a factor in an MFA, or in the continuous authentication of the user.

In an embodiment, the authentication employing a push mechanism and sound may be automatic, i.e., the user entry of the code may not be required. In this embodiment, after a user has initially authenticated to a first device (e.g., device 118) or an application associated with the first device, a security component associated with the device (e.g., component 115, or 116) may determine, e.g., from a user persona, or from the log in itself, the identity of a second device associated with the user (e.g., device 102). With this information, the security component may push an instruction to the second device to emit a sound known to the security component. For example, the sound may be a random sound developed by the security component at that moment, associated with the user, and pushed to the second device. The random sound may be ultrasonic. Then, after: the second device emits the sound in response to the push notification; the sound is received by a microphone of the first device; the security component 115, 116 compares the received sound to the sound from the instruction; and the received sound matches the sound from the instruction, the security component may use the receipt of the sound as discussed in this disclosure to authenticate the user—either as a factor in an MFA, or in the continuous authentication of the user.

The embodiments using push notification of a sound may be used as first or second factors of an MFA authentication. The embodiments using push notification of a sound may be used for continuous authentication. In the embodiments using push notification of a sound the security component may instruct the sound to change. For example, an audible sound may be used in the initial instruction, and an ultrasonic sound may be used for continuous authentication.

Figure 9:
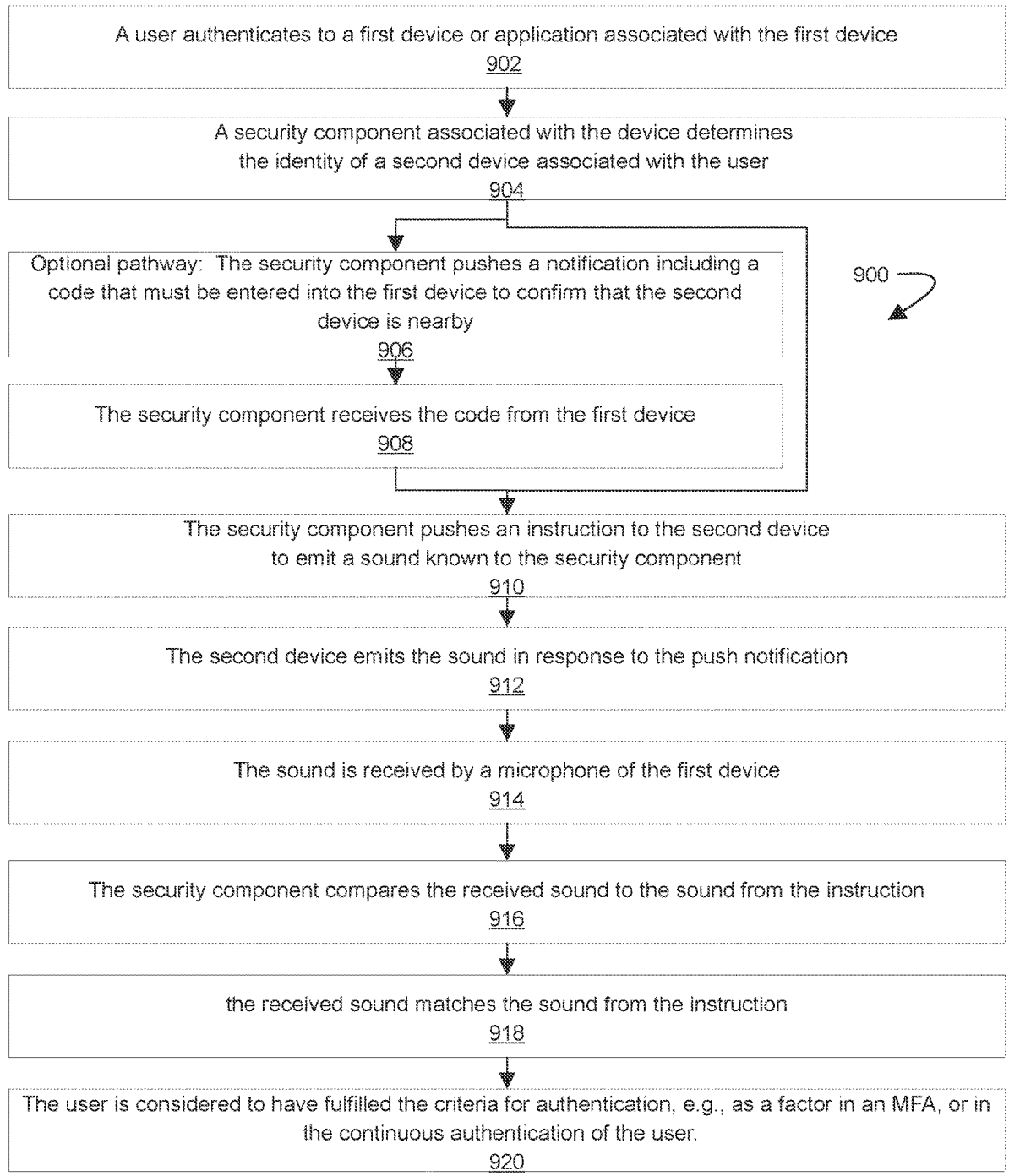
FIG. 9 is a flow chart of embodiments of methods employing user presence for authentication.

FIG. 9 is a flow chart of embodiments of methods employing user presence, push mechanism, and sound for authentication. In method 900, in step 902, A user authenticates to a first device or application associated with the first device. In step 904, a security component associated with the device determines the identity of a second device associated with the user. In an optional pathway including steps 906 and 908, in step 906, the security component pushes a notification including a code that must be entered into the first device to confirm that the second device is nearby. In step 906, the security component receives the code from the first device. In step 908, the security component pushes an instruction to the second device to emit a sound known to the security component. In step 910, the second device emits the sound in response to the push notification. In step 912, the sound is received by a microphone of the first device. In step 924, the security component compares the received sound to the sound from the instruction. In step, 916, the received sound matches the sound from the instruction. In step 920, the user is considered to have fulfilled the criteria for authentication, e.g., as a factor in an MFA, or in the continuous authentication of the user.

In an embodiment, as a factor in an MFA, a security component may receive a recording of a user's voice, e.g., during a user registration session, and associate that file with the user. The security component develops or receives an analysis of the recording. For example, the analysis may include a user voice profile of user voice characteristics. In a subsequent attempt by that user to log in, the security component may receive a new recording of the user's voice. The security component then develops or receives an analysis of the new recording. Then the security component compares the new analysis to the previous analysis, and if the comparison indicates that the analyses match, as determined by, e.g., a characteristic of the new recording being within a threshold value of the characteristic from the initial recording, the security component considers the user to have met the criteria for that authentication factor. In such embodiments, the words spoken in the original recording and in the new recording need not be identical. In other words, the analysis performed on the voice recording may measure voice characteristics that do not depend on the words being spoken. In an embodiment, for the voice recording the security component may prompt the user by providing to the user device a prompt, e.g., a script for: the initial recording, the new recording, or both. The script need not be identical. In an embodiment, the user may, when authenticating, need only speak a single word, which when received by the security component, is analyzed and compared to the analysis of the initial recording to determine whether to authenticate the user. In embodiments, the analysis of the initial recording may be performed and stored by the security component for later access, or the initial voice recording may be stored, and the analysis of the original recording be performed at the same time as the analysis of the new recording. When the analyses of the initial and new recordings being performed at the same time, there is less chance that the method of analysis influences the outcome of the comparison. Furthermore, when the analyses are performed at the same time, an improved methods of analysis may be used, e.g., one that was not available when the initial recording was made. Thus, in embodiments, when authenticating to an application with access to the device microphone, the user need only speak a single word or phrase, e.g., "log me in." After receipt and analysis of the recorded word by the security component associated with the application, and a match to an analysis of an initial recording, the user is considered to have fulfilled that criteria for authentication.

Additional embodiments of methods may include any of the following.

In the method 800, the continuity of presence of the user may be determined from detecting use by the user of the first computing device; and the determination that the continuity criteria is not fulfilled may include detecting a discontinuity in the use by the user for a duration greater than a threshold duration. In the method 800, the continuity of presence of the user may be determined from detecting an image associated with the user of the first computing device; and the determination that the continuity criteria is not fulfilled may include detecting a discontinuity in detecting the image. In the method 800, the continuity of presence of the user may be determined from detecting movement of the user of the first computing device; and the determination that the continuity criteria is not fulfilled may include detecting a discontinuity in detecting the movement of the user for a duration greater than a threshold duration. In the method 800, the continuity of presence of the user may be determined from detecting at least one of: use by the user of the first computing device; an image associated with the user; or movement of the user; and the determination that the continuity criteria is not fulfilled may include detecting a simultaneous discontinuity in: the use by the user of the first computing device; the image associated with the user; and the movement of the user.

In embodiments, an administrative process associated with authentication criteria may include one or more of the following. An embodiment based on method 800 or 802 may further include: a step of receiving first information regarding a user during an administrative process; a step of creating a first persona associated with the user based on the first information; and a step of adding the continuity criteria to the set of criteria for the first persona based on the first information. In an embodiment, the administrative process may include an on-boarding process; the first information regarding the user may be received from an administrator or automatically provided as a consequence of an action by the administrator; the first information regarding the user may include a work-related location associated with the user; and the first persona is associated with the work-related location. In an embodiment, the embodiment may further include: a step of associating, based on the first information, a policy with the user; and a step of adding the continuity criteria based on the policy and the first information. In an embodiment, the first information may include equipment information associated with the user or the work-related location; and adding the continuity criteria based on the policy and the first information, may include adding the continuity criteria based on the policy and the equipment information. In an embodiment, for a given policy and given equipment information, a default continuity criteria may be added. In an embodiment, the continuity criteria may be a first continuity criteria and the set of criteria may be a first set of criteria, with the method further comprising: a step of monitoring the user; a step of developing from the monitoring, second information regarding the user; a step of creating a second persona associated with the user based on the second information; and a step of adding a second continuity criteria to a second set of criteria based on the second information. In an embodiment, the continuity criteria may be a first continuity criteria and the set of criteria may be a first set of criteria, with the method further comprising: a step of receiving from the user responses to a list of questions provided as part of the administrative process; a step of developing from the responses, second information regarding the user; a step of creating a second persona associated with the user based on the second information; and a step of adding a second continuity criteria to a second set of criteria based on the second information.

Embodiments regarding authentication criteria may include one or more of the following. In the method 800 or 802, determining whether the user fulfills the continuity criteria and/or fulfills an MFA criteria, may require: a step of receiving, from the second computing device, a measurement; a step of comparing the measurement to a measurement criteria; and, when the comparison indicates the measurement fulfills the measurement criteria, a step of determining that the user has fulfilled the continuity criteria. In an embodiment, the measurement criteria may include a measurement associated with a user location. In an embodiment, the measurement associated with a user location may include a room measurement. In an embodiment, the measurement criteria may be created using the first computing device associated with the user. In an embodiment, the measurement criteria may be created using a camera of the first computing device, or using a radio frequency emitted by the first computing device. In an embodiment, the measurement criteria may include a measurement associated with the first computing device. Thus, in some embodiments, an emission from a device may include a frequency or frequencies that propagate as electromagnetic radiation, i.e., as radio waves. In an embodiment, the measurement associated with the first computing device may include an orientation of the first computing device. In an embodiment, the orientation of the user device is determined by: the first computing device being placed in an apparatus; and the first computing device providing the orientation of the first computing device.

In some embodiments, an emission may include a sound or sounds that propagate as acoustic waves. In an embodiment, the first emission may include a sound frequency inaudible to humans. In an embodiment, the inaudible sound frequency may be above a frequency audible to humans. In an embodiment, the inaudible sound frequency may be below a frequency audible to humans.

In the method 800 or 802, a second criteria of the set of criteria may require: a step of receiving, from the first computing device, a first image associated with the user of the first computing device; a step of comparing the first image to an image criteria; and, only when the comparison indicates that the first image fulfills the image criteria, a step of determining that the second criteria is fulfilled. In an embodiment, the image criteria may include a second image previously acquired from the user. In an embodiment, the second image may be of a room associated with the user. In an embodiment, the image criteria may include a third image of an object associated with the user. In an embodiment, the object associated with the user may include a fourth image or a pattern.

In the method 800 or 802, a plurality of personas may be associated with the user, and the method may further require: a step of determining, from context information associated with the user, that a first persona of the plurality of personas applies to the user; and a step of retrieving, from the first persona, one or both of the first criteria and the continuity criteria. In an embodiment, the context information associated with the user may include an identity of the first computing device associated with the request for authentication. In an embodiment, the first persona may be associated with the first computing device and the first computing device may be different from a second computing device associated with a second persona of the plurality of personas. In an embodiment, the context information associated with the user may include a location associated with the request for authentication. In an embodiment, the context information associated with the user may include a mode of travel associated with the request for authentication. In an embodiment, the first persona may be associated with a first security level different from a second security level associated with a second persona of the plurality of personas.

Figure 10:
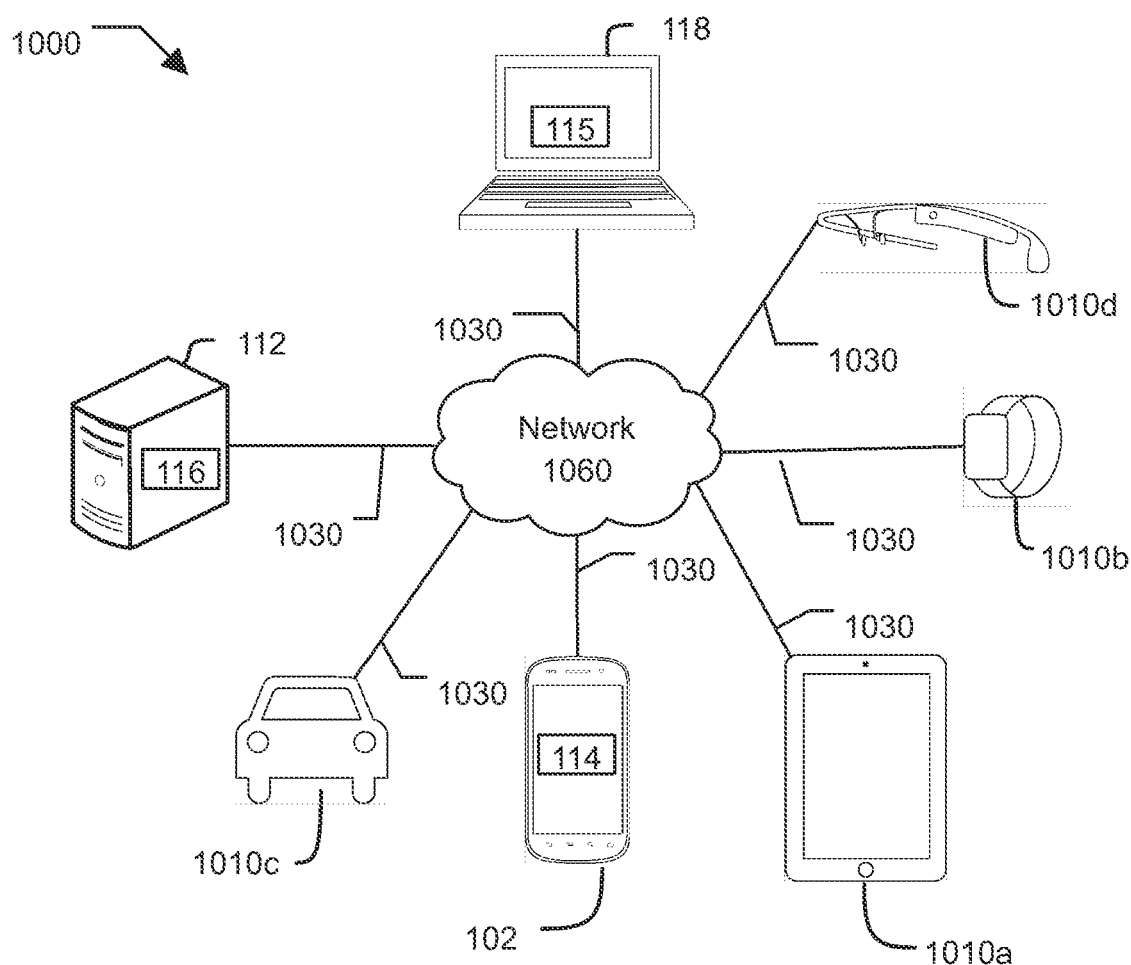
FIG. 10 is an exemplary block diagram depicting an embodiment of system for implementing embodiments of methods of the disclosure.

FIG. 10 is an exemplary block diagram depicting an embodiment of system for implement embodiments of methods of the disclosure. In FIG. 10, computer network 1000 includes a number of computing devices 102, 118, and 1010*a*-1010*d*, and one or more server systems 112 coupled to a communication network 1060 via a plurality of communication links 1030. Communication network 1060 provides a mechanism for allowing the various components of distributed network 1000 to communicate and exchange information with each other.

Communication network 1060 itself is comprised of one or more interconnected computer systems and communication links. Communication links 1030 may include hardwire links, optical links, satellite or other wireless communications links, wave propagation links, or any other mechanisms for communication of information. Various communication protocols may be used to facilitate communication between the various systems shown in FIG. 10. These communication protocols may include TCP/IP, UDP, HTTP protocols, wireless application protocol (WAP), BLUETOOTH, Zigbee, 802.11, 802.15, 6LoWPAN, LiFi, Google Weave, NFC, GSM, CDMA, other cellular data communication protocols, wireless telephony protocols, Internet telephony, IP telephony, digital voice, voice over broadband (VoBB), broadband telephony, Voice over IP (VoIP), vendor-specific protocols, customized protocols, and others. While in one embodiment, communication network 1060 is the Internet, in other embodiments, communication network 1060 may be any suitable communication network including a local area network (LAN), a wide area network (WAN), a wireless network, a cellular network, a personal area network (such a Bluetooth or 802.15.4, or ZigBee), an intranet, a private network, a near field communications (NFC) network, a public network, a switched network, a peer-to-peer network, and combinations of these, and the like.

In an embodiment, the server 112 is not located near a user of a computing device, and is communicated with over a network. In a different embodiment, the server 112 is a device that a user can carry upon his person, or can keep nearby. In an embodiment, the server 112 has a large battery to power long distance communications networks such as a cell network or Wi-Fi. The server 112 communicates with the other components of the personal mobile device system via wired links or via low powered short range wireless communications such as Bluetooth. In an embodiment, one of the other components of the personal mobile device system plays the role of the server, e.g., the watch 1010b, the head mounted device or glasses or virtual reality or extended or augmented reality device 1010d, the phone or mobile communications device 102, the tablet 1010a, the PC 118, and/or the vehicle (e.g., an automobile, or other manned or unmanned or autonomous vehicle for land or aerial or aquatic operation) 1010c. Other of the device may be, or be equipped with, extended reality devices, e.g., devices 102, 1010a, 1010b, and 1010c. Other types of computing devices 1010 include other wearable devices, devices incorporated into clothing, implantable or implanted devices, ingestible devices, or 'things' in the internet of things (IoT), which may be sensors or actuators or mobile or sessile devices, or hubs or servers controlling such 'things' or facilitating their communications.

Distributed computer network 1000 in FIG. 10 is merely illustrative of an embodiment incorporating the embodiments and does not limit the scope of the invention as recited in the claims. One of ordinary skill in the art would recognize other variations, modifications, and alternatives. For example, more than one server system 112 may be connected to communication network 1060. As another example, a number of computing devices 112, 118, and 1010a-1010d may be coupled to communication network 1060 via an access provider (not shown) or via some other server system.

Computing devices 102, 118, and 1010a-1010d typically request information from a server system that provides the information. Server systems by definition typically have more computing and storage capacity than these computing devices, which are often such things as portable devices, mobile communications devices, or other computing devices that play the role of a client in a client-server operation. However, a particular computing device may act as both a client and a server depending on whether the computing device is requesting or providing information. Aspects of the embodiments may be embodied using a client-server environment or a cloud-cloud computing environment.

Server 112 is responsible for receiving information requests from computing devices 102, 118, and 1010a-1010d, for performing processing required to satisfy the requests, and for forwarding the results corresponding to the requests back to the requesting computing device. The processing required to satisfy the request may be performed by server system 112 or may alternatively be delegated to other servers connected to communication network 1060 or to other communications networks. A server 112 may be located near the computing devices 102, 118, and 1010a-1010d or may be remote from the computing devices 112, 118, and 1010a-1010d. A server 112 may be a hub controlling a local enclave of things in an internet of things scenario.

Computing devices 102, 118, and 1010a-1010d enable users to access and query information or applications stored by server system 112. Some example computing devices include portable electronic devices (e.g., mobile communications devices) such as the Apple iPhone®, the Apple iPad®, or any computing device running the Apple iOS™, Android™ OS, Google Chrome OS, Symbian OS®, Windows 10, Windows Mobile® OS, or any of various operating systems used for Internet of Things (IoT) devices or automotive or other vehicles or Real Time Operating Systems (RTOS), such as the RIOT OS, Windows 10 for IoT, WindRiver VxWorks, ARM Mbed OS, Embedded Apple iOS and OS X, the Nucleus RTOS, Green Hills Integrity, or Contiki, or any of various Programmable Logic Controller (PLC) or Programmable Automation Controller (PAC) operating systems such as Microware OS-9, VxWorks, QNX Neutrino, FreeRTOS, Micrium µC/OS-II, Micrium µC/OS-III, Windows CE, TI-RTOS, RTEMS. Other operating systems may be used. In a specific embodiment, a "web browser" application executing on a computing device enables users to select, access, retrieve, or query information and/or applications stored by server system 112. Examples of web browsers include the Android browser provided by Google, the Safari® browser provided by Apple, the Opera Web browser provided by Opera Software, the BlackBerry® browser provided by Research In Motion, the Internet Explorer® and Internet Explorer Mobile browsers provided by Microsoft Corporation, the Firefox® and Firefox for Mobile browsers provided by Mozilla®, and others.

Figure 11:
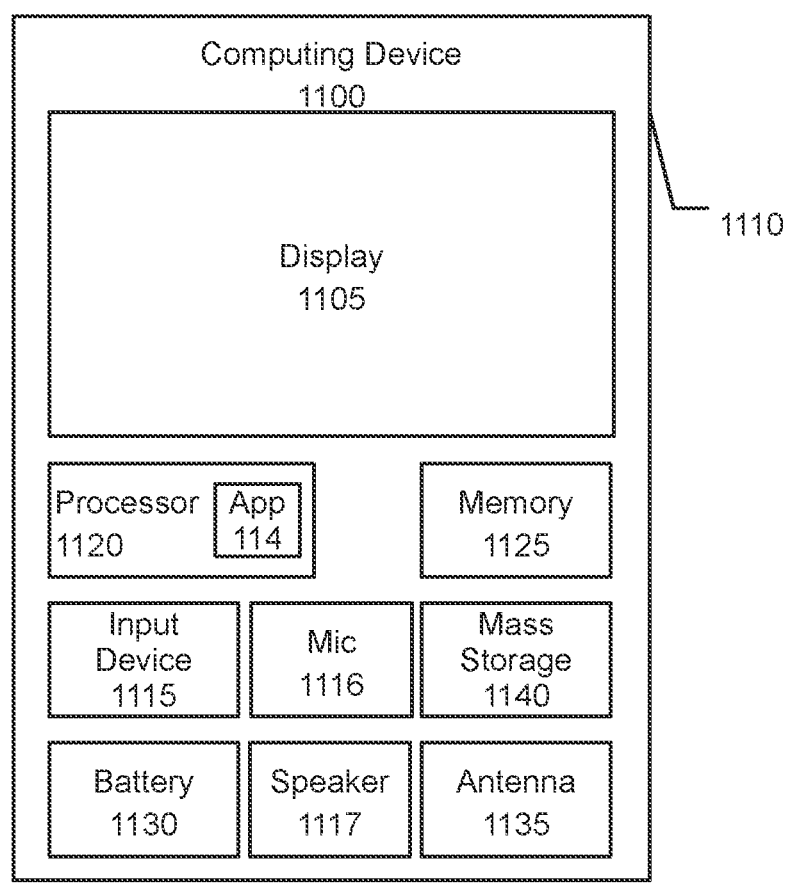
FIG. 11 is an exemplary block diagram depicting a computing device 1000 of an embodiment.

FIG. 11 is an exemplary block diagram depicting a computing device 1100 of an embodiment. Computing device 1100 may represent any of the computing devices 102, 112, 118, and 1010a-1010d from FIG. 10. Computing device 1100 may include a display, screen, or monitor 1105, housing 1110, and input device 1115. Housing 1110 houses familiar computer components, some of which are not shown, such as a processor 1120, memory 1125, battery 1130, speaker 1117, transceiver, antenna 1135, microphone 1116, ports, jacks, connectors, camera, input/output (I/O) controller, display adapter, network interface, mass storage devices 1140, various sensors, and the like. Computing device 1100 may represent server 112, less any elements that one of skill would not expect to be associated with a server.

Input device 1115 may also include a touchscreen (e.g., resistive, surface acoustic wave, capacitive sensing, infrared, optical imaging, dispersive signal, or acoustic pulse recognition), keyboard (e.g., electronic keyboard or physical keyboard), buttons, switches, stylus, or combinations of these.

Mass storage devices 1140 may include flash and other nonvolatile solid-state storage or solid-state drive (SSD), such as a flash drive, flash memory, or USB flash drive. Other examples of mass storage include mass disk drives, floppy disks, magnetic disks, optical disks, magneto-optical disks, fixed disks, hard disks, SD cards, CD-ROMs, recordable CDs, DVDs, recordable DVDs (e.g., DVD-R, DVD+R, DVD-RW, DVD+RW, HD-DVD, or Blu-ray Disc), battery-backed-up volatile memory, tape storage, reader, and other similar media, and combinations of these.

Embodiments may also be used with computer systems having different configurations, e.g., with additional or fewer subsystems. For example, a computer system could include more than one processor (i.e., a multiprocessor system, which may permit parallel processing of information) or a system may include a cache memory. The computer system shown in FIG. 11 is but an example of a computer system suitable for use with the embodiments. Other configurations of subsystems suitable for use with the embodiments will be readily apparent to one of ordinary skill in the art. For example, in a specific implementation, the computing device is a mobile communications device such as a smartphone or tablet computer. Some specific examples of smartphones include the Droid Incredible and Google Nexus One, provided by HTC Corporation, the iPhone or iPad, both provided by Apple, and many others. The computing device may be a laptop or a netbook. In another specific implementation, the computing device is a non-portable computing device such as a desktop computer or workstation.

A computer-implemented or computer-executable version of the program instructions useful to practice the embodiments may be embodied using, stored on, or associated with computer-readable medium. A computer-readable medium may include any medium that participates in providing instructions to one or more processors for execution, such as memory 1125 or mass storage 1140. Such a medium may take many forms including, but not limited to, nonvolatile, volatile, transmission, non-printed, and printed media. Nonvolatile media includes, for example, flash memory, or optical or magnetic disks. Volatile media includes static or dynamic memory, such as cache memory or RAM. Transmission media includes coaxial cables, copper wire, fiber optic lines, and wires arranged in a bus. Transmission media can also take the form of electromagnetic, radio frequency, acoustic, or light waves, such as those generated during radio wave and infrared data communications.

For example, a binary, machine-executable version, of the software useful to practice the embodiments may be stored or reside in RAM or cache memory, or on mass storage device 1140. The source code of this software may also be stored or reside on mass storage device 1040 (e.g., flash drive, hard disk, magnetic disk, tape, or CD-ROM). As a further example, code useful for practicing the embodiments may be transmitted via wires, radio waves, or through a network such as the Internet. In another specific embodiment, a computer program product including a variety of software program code to implement features of the embodiment (e.g., embodiments of guide 810) is provided. In the embodiment, the computer program product may include multiple software modules that cooperate to implement features of the embodiment. In the embodiment, the multiple software modules may be distributed among one or more of networked computing devices 102, 118, and 1010a-1010d.

Computer software products may be written in any of various suitable programming languages, such as C, C++, C#, Pascal, Fortran, Perl, Matlab (from MathWorks, www-.mathworks.com), SAS, SPSS, JavaScript, CoffeeScript, Objective-C, Swift, Objective-J, Ruby, Python, Erlang, Lisp, Scala, Clojure, Java, Rust, Go, R, Kotlin, PHP, ECMAScript, WebAssembly. The computer software product may be an independent application with data input and data display modules. Alternatively, the computer software products may be classes that may be instantiated as distributed objects. The computer software products may also be component software such as Java Beans (from Oracle) or Enterprise Java Beans (EJB from Oracle).

An operating system for the system may be the Android operating system, iPhone OS (i.e., iOS), Symbian, BlackBerry OS, Palm web OS, Bada, MeeGo, Maemo, Limo, or Brew OS. Other examples of operating systems include one of the Microsoft Windows family of operating systems (e.g., Windows 10 or other Windows versions, Windows CE, Windows Mobile, Windows Phone, Windows 10 Mobile), Linux, HP-UX, UNIX, Sun OS, Solaris, Mac OS X, Alpha OS, AIX, or any of various operating systems used for Internet of Things (IoT) devices or automotive or other vehicles or Real Time Operating Systems (RTOS), such as the RIOT OS, Windows 10 for IoT, WindRiver VxWorks, ARM Mbed OS, Embedded Apple iOS and OS X, the Nucleus RTOS, Green Hills Integrity, or Contiki, or any of various Programmable Logic Controller (PLC) or Programmable Automation Controller (PAC) operating systems such as Microware OS-9, VxWorks, QNX Neutrino, FreeRTOS, Micrium μC/OS-II, Micrium μC/OS-III, Windows CE, TI-RTOS, RTEMS. Other operating systems may be used.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system useful in practicing the embodiments using a wireless network employing a protocol such as Wi-Fi (IEEE standards 802.11, 802.11a, 802.11b, 802.11e, 802.11g, 802.11i, and 802.11n, just to name a few examples), or other protocols, such as BLUETOOTH or NFC or 802.15 or cellular, or communication protocols may include TCP/IP, UDP, HTTP protocols, wireless application protocol (WAP), BLUETOOTH, Zigbee, 802.11, 802.15, 6LoWPAN, LiFi, Google Weave, NFC, GSM, CDMA, other cellular data communication protocols, wireless telephony protocols or the like. For example, signals from a computer may be transferred, at least in part, wirelessly to components or other computers.

While the embodiments have been described with regards to particular embodiments, it is recognized that additional variations may be devised without departing from the inventive concept.

The terminology used herein is for the purpose of describing particular embodiments only and is not intended to be limiting of the claimed subject matter. As used herein, the term "and/or" includes any and all combinations of one or more of the associated listed items. As used herein, the singular forms "a," "an," and "the" are intended to include the plural forms as well as the singular forms, unless the context clearly indicates otherwise. It will further be understood that the terms "comprises" and/or "comprising," when used in this specification, specify the presence of states features, steps, operations, elements, and/or components, but do not preclude the present or addition of one or more other features, steps, operations, elements, components, and/or groups thereof.

Unless otherwise defined, all terms (including technical and scientific terms) used herein have the same meaning as commonly understood by one having ordinary skill in the art to which the embodiments belong. It will further be understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the embodiments, it will be understood that a number of elements, techniques, and steps are disclosed. Each of these has individual benefit and each can also be used in conjunction with one or more, or in some cases all, of the other disclosed elements, or techniques. The specification and claims should be read with the understanding that such combinations are entirely within the scope of the embodiments and the claimed subject matter.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples and are not meant to be limiting in any way. Other steps and functions may be contemplated without departing from this disclosure or the scope of an embodiment.

What is claimed is:

1. A method comprising:
   receiving, by a security component, a request for authentication of a user associated with a first computing device;
   determining, from context information associated with the user, whether a first persona or a second persona, of a plurality of personas associated with the user, applies to the request for authentication of the user;
   authenticating, by the security component, the user based on a set of criteria obtained from the persona determined to apply to the request for authentication, a first criterion of the set requiring a presence of a second computing device with respect to the first computing device;
   as a result of the authentication of the user, providing, by the security component, the user with an access;
   determining, by the security component, whether continuity criteria also obtained from the persona determined to apply to the request for authentication is fulfilled, each of the plurality of personas having continuity criteria requiring a different proximity range, the continuity criteria requiring a continuity of the presence of the second computing device with respect to the first computing device within the proximity range of the persona determined to apply to the request for authentication, the proximity range being between the second computing device and the first computing device; and
   when the determination is that the continuity criteria is not fulfilled, denying, by the security component, an aspect of the access to the user.

2. The method of claim 1, wherein the determining whether the continuity criteria is fulfilled includes:
   determining a change of a detected strength of an emission of electromagnetic radiation from the first computing device or from the second computing device; and
   determining that the continuity criteria is not fulfilled includes a determination that the change indicates the detected strength has decreased to be below a threshold signal strength.

3. The method of claim 2, wherein the emission of electromagnetic radiation is an ultra-wide band emission.

4. The method of claim 1, wherein:
   the continuity of the presence of the second computing device is based on a proximity of the second computing device to the first computing device;
   the first computing device is configured to detect the proximity of the second computing device with a plurality of methods for detecting proximity;
   the determining whether the continuity criteria is fulfilled includes determining whether the first computing device detects the proximity of the second computing device by any of the plurality of methods for detecting proximity; and
   the determination that the continuity criteria is not fulfilled includes a determination that the first computing device does not detect the proximity of the second computing device by any of the plurality of methods for detecting proximity.

5. The method of claim 1, wherein:
   for the first persona:
      a discontinuity in the presence of the second computing device results in a determination that the continuity criteria is not fulfilled; and
   for the second persona:
      a discontinuity in the presence of the second computing device results in the continuity criteria not being fulfilled when the discontinuity is greater than a threshold amount.

6. The method of claim 2, wherein:
   the first persona includes a first proximity threshold distance; and
   the second persona is associated with a higher level of security than the first persona and includes a second proximity threshold distance less than the first proximity threshold distance.

7. A system including a first computing device and a second computing device and instructions, which when executed, cause the system to perform steps comprising:
   receiving, by a security component, a request for authentication of a user associated with the first computing device;
   determining, from context information associated with the user, whether a first persona or a second persona, of a plurality of personas associated with the user, applies to the request for authentication of the user;
   authenticating, by the security component, the user based on a set of criteria obtained from the persona determined to apply to the request for authentication, a first criterion of the set requiring a presence of the second computing device with respect to the first computing device;
   as a result of the authentication of the user, providing, by the security component, the user with an access;
   determining, by the security component, whether continuity criteria also obtained from the persona determined to apply to the request for authentication is fulfilled, each of the plurality of personas having continuity criteria requiring a different proximity range, the continuity criteria requiring a continuity of the presence of the second computing device with respect to the first computing device within the proximity range of the persona determined to apply to the request for authentication, the proximity range being between the second computing device and the first computing device; and when the determination is that the continuity criteria is not fulfilled, denying, by the security component, an aspect of the access to the user.

8. The system of claim 7, wherein the determining whether the continuity criteria is fulfilled includes:

determining a change of a detected strength of an emission of electromagnetic radiation from the first computing device or from the second computing device; and determining that the continuity criteria is not fulfilled the change indicates that the detected signal strength has decreased to be below a threshold signal strength.

9. The system of claim 7, wherein the emission of electromagnetic radiation is an ultra-wide band emission.

10. The system of claim 7, wherein:

the continuity of the presence of the second computing device is based on a proximity of the second computing device to the first computing device;

the first computing device is configured to detect the proximity of the second computing device with a plurality of methods for detecting proximity;

the determining whether the continuity criteria is fulfilled includes determining whether the first computing device detects the proximity of the second computing device by any of the plurality of methods for detecting proximity; and the determination that the continuity criteria is not fulfilled includes a determination that the first computing device does not detect the proximity of the second computing device by any of the plurality of methods for detecting proximity.

11. The system of claim 7, wherein for the first persona:

a discontinuity in the presence of the second computing device results in a determination that the continuity criteria is not fulfilled; and for the second persona:

a discontinuity in the presence of the second computing device results in the continuity criteria not being fulfilled when the discontinuity is greater than a threshold amount.

12. The system of claim 8, wherein:

the first persona includes a first proximity threshold distance; and the second persona is associated with a higher level of security than the first persona and includes a second proximity threshold distance less than the first proximity threshold distance.

13. A non-transitory computer-readable medium including instructions, which when executed by a processor of a first computing device, cause the first computing device to perform the steps including:

receiving a request for authentication of a user associated with the first computing device;

determining, from context information associated with the user, whether a first persona or a second persona, of a plurality of personas associated with the user, applies to the request for authentication of the user;

authenticating the user based on a set of criteria obtained from the persona determined to apply to the request for authentication, a first criterion of the set requiring a presence of a second computing device with respect to the first computing device;

as a result of the authentication of the user, providing the user with an access;

determining whether continuity criteria also obtained from the persona determined to apply to the request for authentication is fulfilled, each of the plurality of personas having continuity criteria requiring a different proximity range, the continuity criteria requiring a continuity of the presence of the second computing device with respect to the first computing device within the proximity range of the persona determined to apply to the request for authentication, the proximity range being between the second computing device and the first computing device; and when the determination is that the continuity criteria is not fulfilled, denying an aspect of the access to the user.

14. The computer-readable medium of claim 13, wherein the determining whether the continuity criteria is fulfilled includes:

determining a change of a detected strength of an emission of electromagnetic radiation from the first computing device or from the second computing device; and determining that the continuity criteria is not fulfilled includes a determination that the change indicates that the detected signal strength has decreased to be below a threshold signal strength.

15. The computer-readable medium of claim 13, wherein the emission of electromagnetic radiation is an ultra-wide band emission.

16. The computer-readable medium of claim 13, wherein:

the continuity of the presence of the second computing device is based on a proximity of the second computing device to the first computing device;

the first computing device is configured to detect the proximity of the second computing device with a plurality of methods for detecting proximity;

the determining whether the continuity criteria is fulfilled includes determining whether the first computing device detects the proximity of the second computing device by any of the plurality of methods for detecting proximity; and the determination that the continuity criteria is not fulfilled includes a determination that the first computing device does not detect the proximity of the second computing device by any of the plurality of methods for detecting proximity.

17. The computer-readable medium of claim 14, wherein:

the first persona includes a first proximity threshold distance; and the second persona is associated with a higher level of security than the first persona and includes a second proximity threshold distance less than the first proximity threshold distance.

* * * * *